(12) United States Patent
Egami

(10) Patent No.: US 6,832,157 B2
(45) Date of Patent: Dec. 14, 2004

(54) DRIVING ASSIST SYSTEM

(75) Inventor: Masahiro Egami, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/656,241

(22) Filed: Sep. 8, 2003

(65) Prior Publication Data

US 2004/0061596 A1 Apr. 1, 2004

(30) Foreign Application Priority Data

Sep. 27, 2002 (JP) .................................... 2002-282985

(51) Int. Cl.[7] .............................................. G06F 17/10
(52) U.S. Cl. ........................ 701/301; 701/66; 701/96; 340/435; 340/436; 340/903
(58) Field of Search ........................ 701/66, 96, 300, 701/301; 340/435, 436, 903

(56) References Cited

U.S. PATENT DOCUMENTS 5,721,679 A * 2/1998 Monson ....................... 701/207
5,751,576 A * 5/1998 Monson ....................... 700/83

FOREIGN PATENT DOCUMENTS

| JP | 10-166889 A | 6/1998 |
|---|---|---|
| JP | 10-166890 A | 6/1998 |
| JP | 10-211886 A | 8/1998 |

* cited by examiner

Primary Examiner—Gertrude A. Jeanglaude
(74) Attorney, Agent, or Firm—McDermott Will & Emery LLP

(57) ABSTRACT

A driving assist system for a vehicle comprises: a driving environment detection device that detects a driving environment of the vehicle; a risk potential calculation device that calculates a risk potential present along a longitudinal direction (a RPlongitudinal) and a risk potential present along a lateral direction (a RPlateral) relative to the vehicle based upon the driving environment detected by the driving environment detection device; a longitudinal information conveyance device that presents the RPlongitudinal calculated by the risk potential calculation device to a driver; a lateral information conveyance device that presents the RPlateral calculated by the risk potential calculation device to the driver; and a timing control device that adjust an output timing of the longitudinal information conveyance device and an output timing of the lateral information conveyance device so as to prompt a driver to perform a longitudinal driving operation or a lateral driving operation to stabilize behavior of the vehicle when operation and non-operation of the longitudinal information conveyance device and the lateral information conveyance device are switched.

14 Claims, 18 Drawing Sheets

FIG. 3

| INFORMATION CONVEYANCE MODE BEFORE AND AFTER STATUS TRANSITION | | OUTPUT TIMING FOR INFORMATION CONVEYANCE UPON STATUS TRANSITION | | | | | | DESIGN PRINCIPLE |
|---|---|---|---|---|---|---|---|---|
| | | LONGITUDINAL | | | LATERAL | | | |
| BEFORE | AFTER | SIMULTANEOUS | DELAYED | SIMULTANEOUS | DELAYED | | | |
| A | NO INFORMATION | LONGITUDINAL | ○ | | | | | INFORMATION CORRESPONDING TO A SINGLE DIRECTION IS COMMUNICATED PROMPTLY |
| B | NO INFORMATION | LATERAL | | | ○ | | | INFORMATION CORRESPONDING TO A SINGLE DIRECTION IS COMMUNICATED PROMPTLY |
| C | LONGITUDINAL | NO INFORMATION | ○ | | | | | INFORMATION CORRESPONDING TO A SINGLE DIRECTION IS COMMUNICATED PROMPTLY |
| D | LATERAL | NO INFORMATION | | | ○ | | | INFORMATION CORRESPONDING TO A SINGLE DIRECTION IS COMMUNICATED PROMPTLY |
| E | NO INFORMATION | LONGITUDINAL L + LATERAL | ○ | | | ○ | | STEERING RESPONSE OPTIMIZED BY PROMPTING ACCELERATOR PEDAL OPERATION FIRST TO LOWER |
| F | LONGITUDINAL | LONGITUDINAL L + LATERAL | ○ | | | ○ | | STEERING RESPONSE OPTIMIZED BY PROMPTING ACCELERATOR PEDAL OPERATION FIRST TO LOWER |
| G | LATERAL | LONGITUDINAL L + LATERAL | ○ | | | ○ | | STEERING RESPONSE OPTIMIZED BY PROMPTING ACCELERATOR PEDAL OPERATION FIRST TO LOWER |
| H | LONGITUDINAL L + LATERAL | NO INFORMATION | | ○ | | ○ | | FREEDOM IN STEERING OPERATION IS FIRST INDICATED AND THEN ACCELERATOR PEDAL |
| I | LONGITUDINAL L + LATERAL | LONGITUDINAL | | ○ | | ○ | | FREEDOM IN STEERING OPERATION IS FIRST INDICATED AND THEN ACCELERATOR PEDAL |
| J | LONGITUDINAL L + LATERAL | LATERAL | | ○ | | ○ | | FREEDOM IN STEERING OPERATION IS FIRST INDICATED AND THEN ACCELERATOR PEDAL |
| K | LONGITUDINAL | LATERAL | ○ | | | ○ | | NEW RISK IS FIRST INDICATED |
| L | LATERAL | LONGITUDINAL | | | | ○ | | NEW RISK IS FIRST INDICATED |

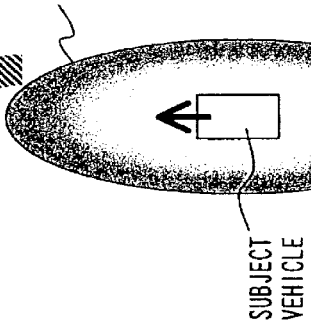
FIG. 6C
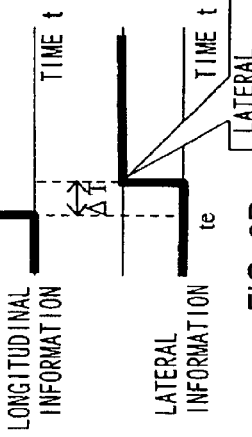
FIG. 6B
FIG. 6D
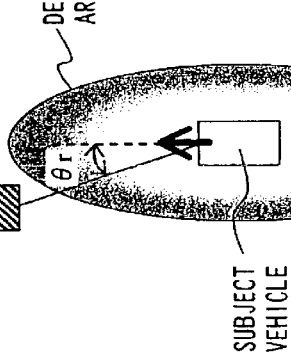
FIG. 6A

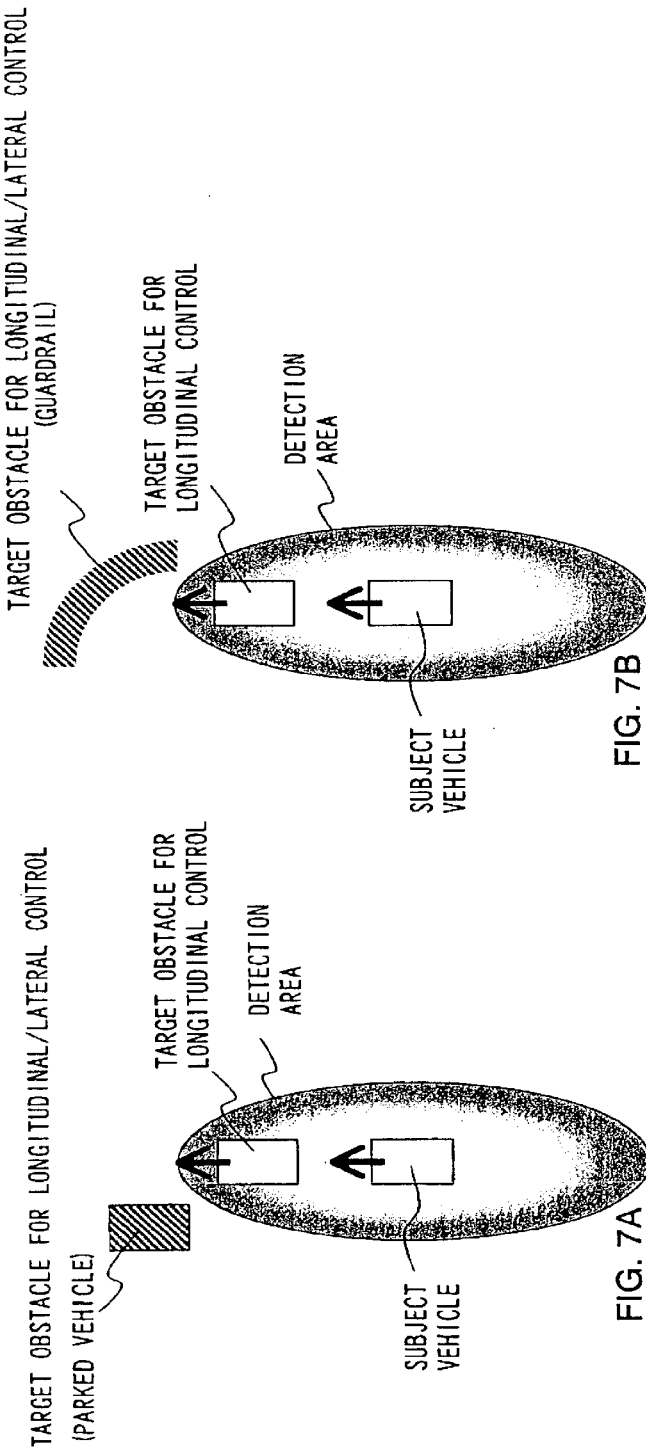
FIG. 7B
FIG. 7A
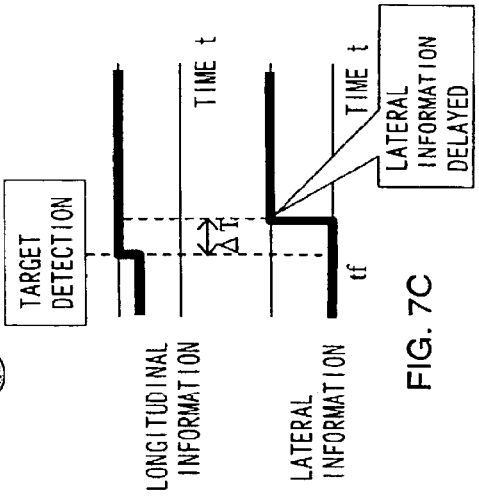
FIG. 7C

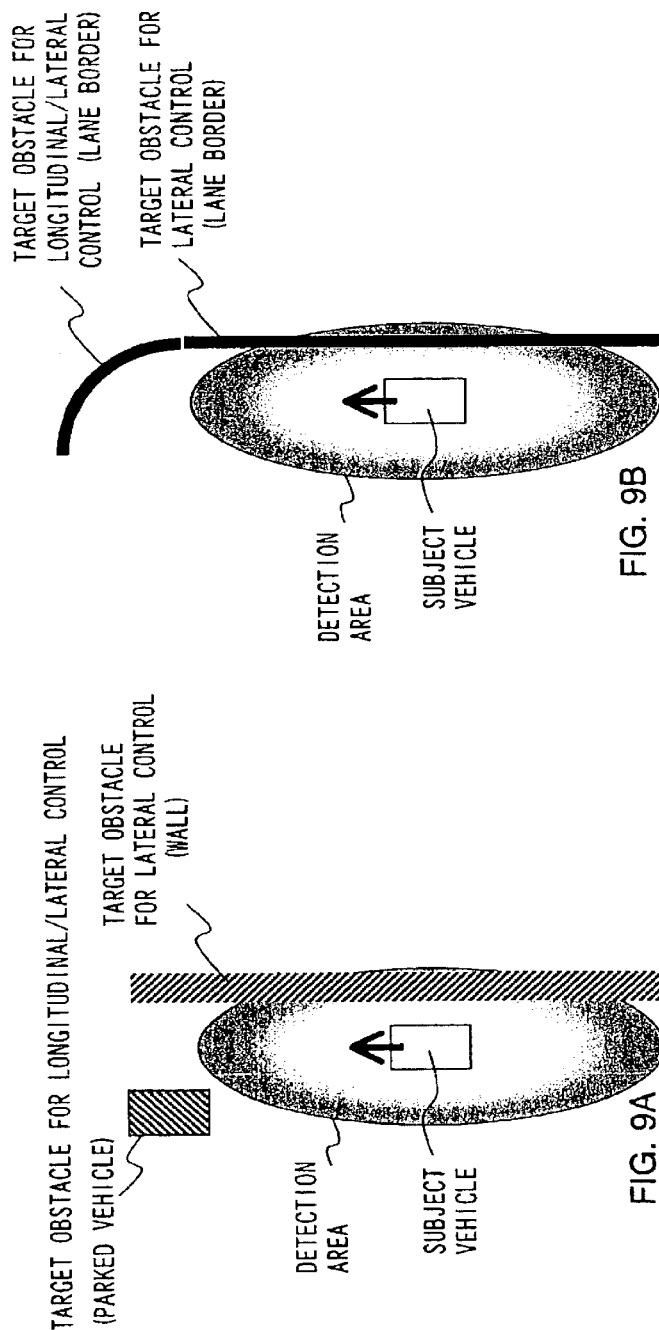
FIG. 9B
FIG. 9A
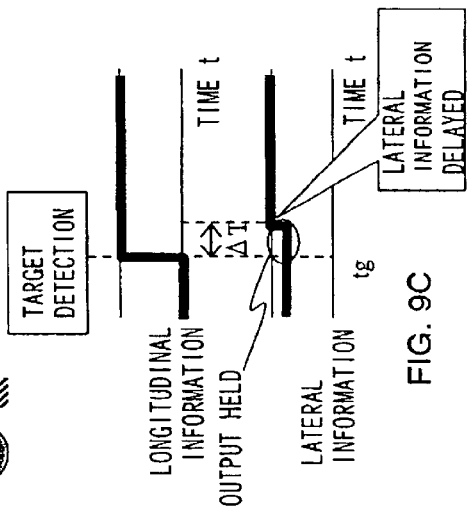
FIG. 9C

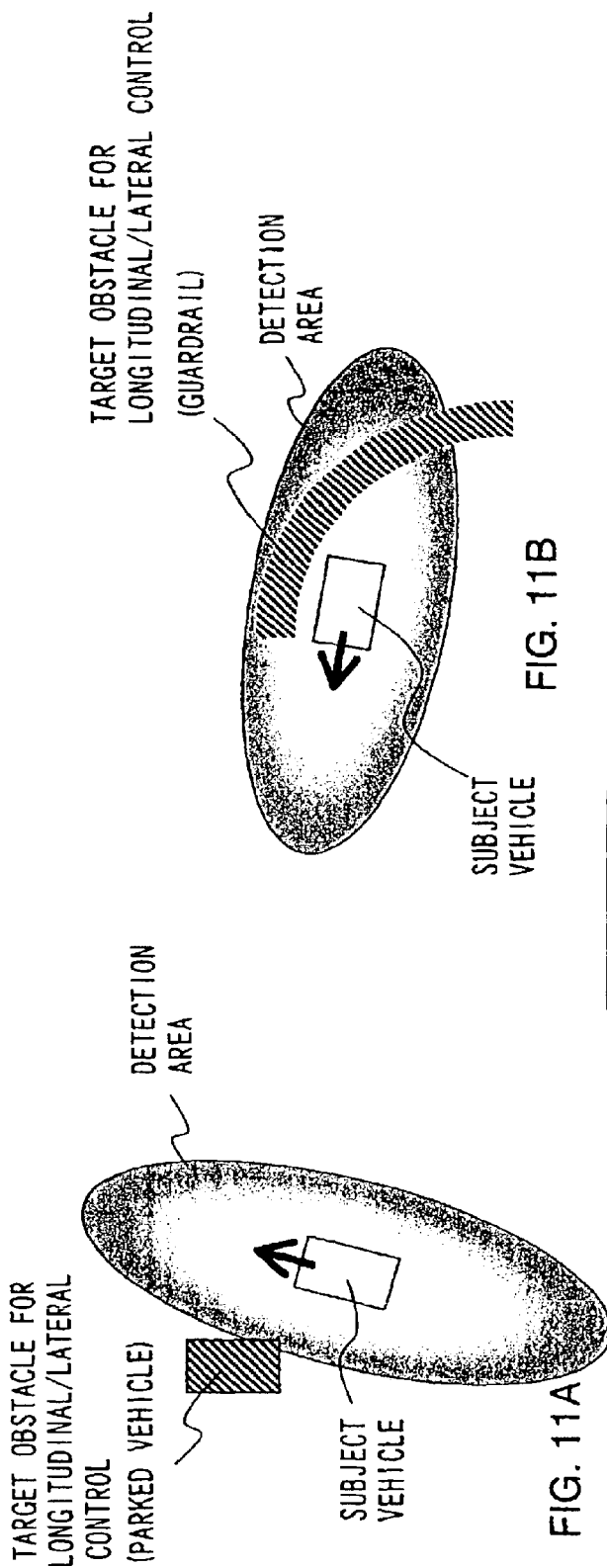
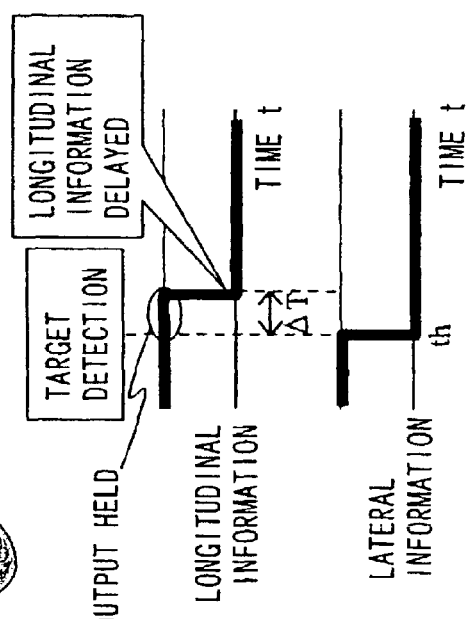
FIG. 11A
FIG. 11B
FIG. 11C

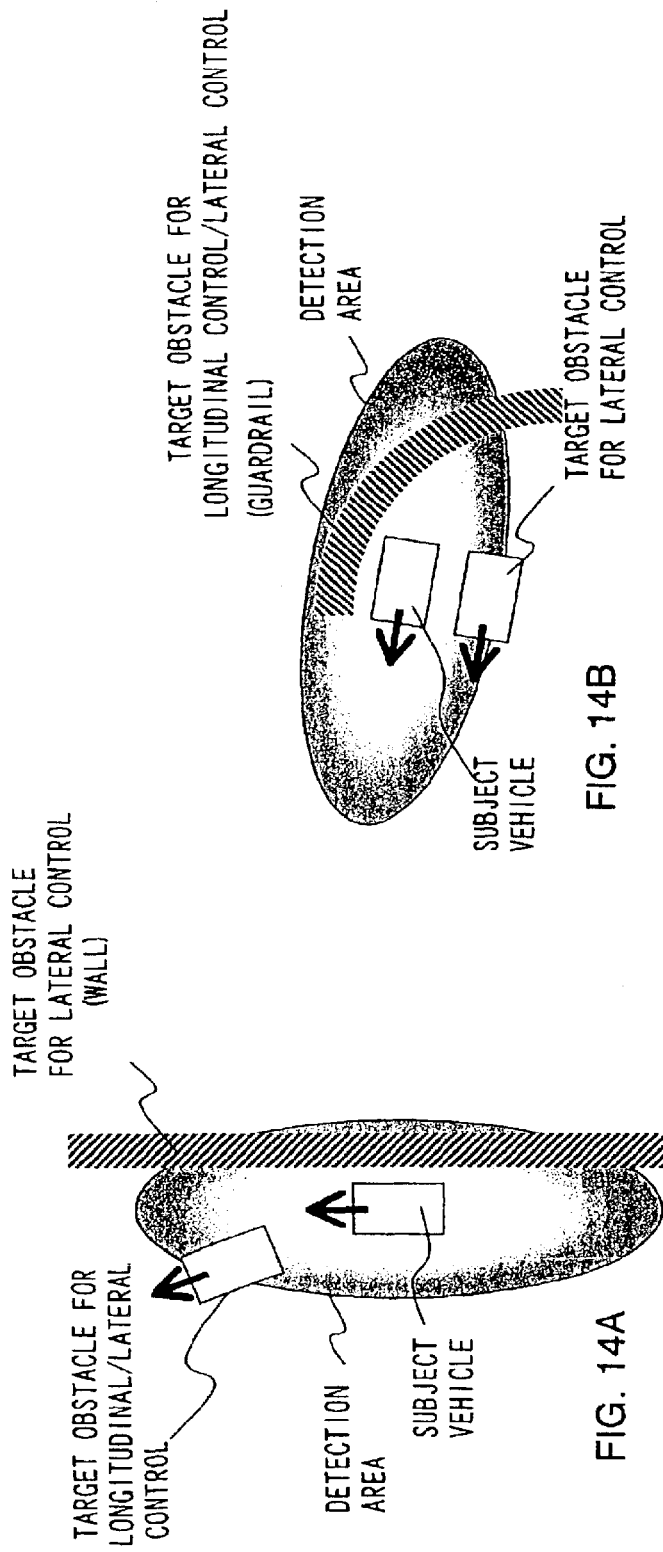
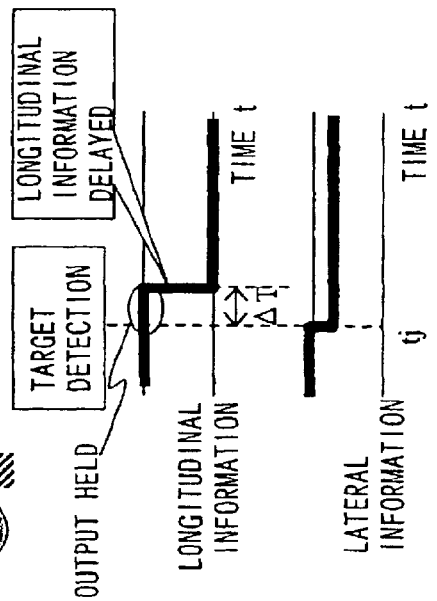
FIG. 14A
FIG. 14B
FIG. 14C

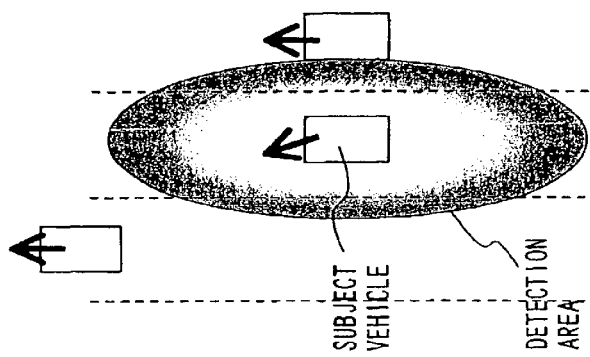
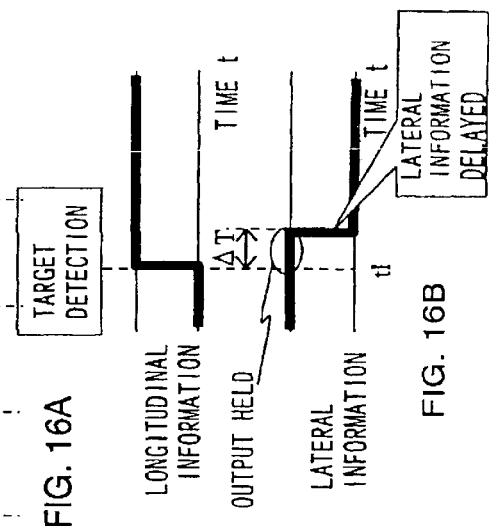
FIG. 16A
FIG. 16B
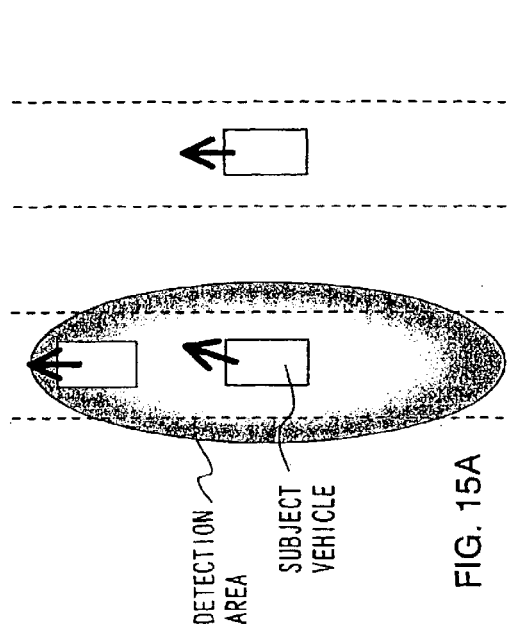
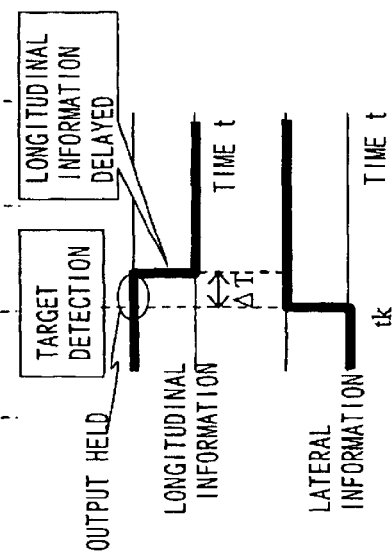
FIG. 15A
FIG. 15B

FIG. 18

| INFORMATION CONVEYANCE MODE BEFORE AND AFTER STATUS TRANSITION | | OUTPUT TIMING FOR INFORMATION CONVEYANCE UPON STATUS TRANSITION | | | | LENGTH OF DELAY |
|---|---|---|---|---|---|---|
| BEFORE | AFTER | LONGITUDINAL | | LATERAL | | |
| | | SIMULTANEOUS | DELAYED | SIMULTANEOUS | DELAYED | |
| NO INFORMATION | LONGITUDINAL + LATERAL | ○ | | | ○ | $\Delta T$ |
| LONGITUDINAL + LATERAL | NO INFORMATION | | ○ | ○ | | $W1\Delta T$ |
| OTHERS | | ○ | | ○ | | 0 |

FIG. 20

| | INFORMATION CONVEYANCE MODE BEFORE AND AFTER STATUS TRANSITION | | OUTPUT TIMING FOR INFORMATION CONVEYANCE UPON STATUS TRANSITION | | | | LENGTH OF DELAY |
|---|---|---|---|---|---|---|---|
| | | | LONGITUDINAL | | LATERAL | | |
| | BEFORE → | AFTER | SIMULTANEOUS | DELAYED | SIMULTANEOUS | DELAYED | |
| E | NO INFORMATION | LONGITUDINAL + LATERAL | ○ | | | ○ | $\Delta T$ |
| F | LONGITUDINAL | LONGITUDINAL + LATERAL | ○ | | | ○ | $W1\Delta T$ |
| G | LATERAL | LONGITUDINAL + LATERAL | ○ | | | ○ | $W1\Delta T$ |
| H | LONGITUDINAL + LATERAL | NO INFORMATION | | ○ | ○ | | $W2\Delta T$ |
| I | LONGITUDINAL + LATERAL | LONGITUDINAL | | ○ | ○ | | $W3\Delta T$ |
| J | LONGITUDINAL + LATERAL | LATERAL | | ○ | ○ | | $W3\Delta T$ |
| K | LONGITUDINAL | LATERAL | ○ | | | ○ | $W4\Delta T$ |
| L | LATERAL | LONGITUDINAL | ○ | | | ○ | $W4\Delta T$ |
| | OTHERS | | ○ | | ○ | | 0 | ns
DRIVING ASSIST SYSTEM

BACKGROUND OF THE INVENTION

1. Field of the Invention

The present invention relates to a driving assist system for a vehicle that assists operations performed by the driver.

2. Description of the Related Art

Systems employed to assist driver operations in the related art include the system disclosed in Japanese Laid Open Patent Publication No. H 10-211886. This system detects obstacles present around the vehicle and determines any latent risk potential that may exist. Then, the system inhibits a steering operation that would lead to an undesirable situation by controlling the steering assist torque based upon the calculated risk potential.

SUMMARY OF THE INVENTION

Depending upon the obstacle conditions around the vehicle, the driver may need to perform an accelerating/decelerating operation in order to avert undesirable consequences in addition to a steering operation. However, it may sometimes be difficult to prompt the driver to drive the vehicle along the desirable direction with the system described above under certain conditions in which an obstacle is present around the vehicle.

The present invention is to provide a driving assist system for a vehicle capable of clearly communicating risk potentials present in the longitudinal direction and the lateral direction relative to the vehicle to the driver.

A driving assist system for a vehicle according to the present invention comprises: a driving environment detection device that detects a driving environment of the vehicle; a risk potential calculation device that calculates a risk potential present along a longitudinal direction (a RPlongitudinal) and a risk potential present along a lateral direction (a RPlateral) relative to the vehicle based upon the driving environment detected by the driving environment detection device; a longitudinal information conveyance device that presents the RPlongitudinal calculated by the risk potential calculation device to a driver; a lateral information conveyance device that presents the RPlateral calculated by the risk potential calculation device to the driver; and a timing control device that adjust an output timing of the longitudinal information conveyance device and an output timing of the lateral information conveyance device so as to prompt a driver to perform a longitudinal driving operation or a lateral driving operation to stabilize behavior of the vehicle when operation and non-operation of the longitudinal information conveyance device and the lateral information conveyance device are switched.

A driving assist system for a vehicle according to the present invention comprises: a driving environment detection means for detecting a driving environment of the vehicle; a risk potential calculation means for calculating a risk potential present along a longitudinal direction (a RPlongitudinal) and a risk potential present along a lateral direction (a RPlateral) relative to the vehicle based upon the driving environment detected by the driving environment detection means; a longitudinal information conveyance means for presenting the RPlongitudinal calculated by the risk potential calculation means to a driver; a lateral information conveyance means for presenting the RPlateral calculated by the risk potential calculation means to the driver; and a timing control means that adjust an output timing of the longitudinal information conveyance means and an output timing of the lateral information conveyance means so as to prompt a driver to perform a longitudinal driving operation or a lateral driving operation to stabilize behavior of the vehicle when operation and non-operation of the longitudinal information conveyance means and the lateral information conveyance means are switched.

A vehicle driving assist method according to the present invention: detects a driving environment of a vehicle; calculats a risk potential present along a longitudinal direction (a RPlongitudinal) and a risk potential present along a lateral direction (a RPlateral) relative to the vehicle based upon the driving environment; presents the calculated RPlongitudinal to a driver; presents the calculated RPlateral to the driver; and adjusts output timing to present the RPlongitudinal and output timing to present the RPlateral so as to prompt a driver to perform a longitudinal driving operation or a lateral driving operation to stabilize behavior of the vehicle.

A vehicle according to the present invention comprises: a driving environment detection device that detects a driving environment of the vehicle; a risk potential calculation device that calculates a risk potential present along a longitudinal direction (a RPlongitudinal) and a risk potential present along a lateral direction (a RPlateral) relative to the vehicle based upon the driving environment detected by the driving environment detection device; a longitudinal information conveyance device that presents the RPlongitudinal calculated by the risk potential calculation device to a driver; a lateral information conveyance device that presents the RPlateral calculated by the risk potential calculation device to the driver; and a timing control device that adjust an output timing of the longitudinal information conveyance device and an output timing of the lateral information conveyance device so as to prompt a driver to perform a longitudinal driving operation or a lateral driving operation to stabilize behavior of the vehicle when operation and non-operation of the longitudinal information conveyance device and the lateral information conveyance device are switched.

BRIEF DESCRIPTION OF THE DRAWINGS

FIG. 3 is a chart showing the reaction force control timing in accordance with the changes in the information communication mode achieved in the first embodiment;

FIGS. 6A~6C show changes in the obstacle conditions around a subject vehicle in case E;

FIG. 6D presents a time chart of the longitudinal/lateral direction reaction force control implemented in case E;

FIGS. 7A and 7B show changes in the obstacle conditions around the subject vehicle in case F;

FIG. 7C presents a time chart of the longitudinal/lateral direction reaction force control implemented in case F;

FIGS. 9A and 9B show changes in the obstacle conditions around the subject vehicle in case G;

FIG. 9C presents a time chart of the longitudinal/lateral direction reaction force control implemented in case G;

FIGS. 11A and 11B show changes in the obstacle conditions around the subject vehicle in case H;

FIG. 11C presents a time chart of the longitudinal/lateral direction reaction force control implemented in case H;

FIGS. 14A and 14B show changes in the obstacle conditions around the subject vehicle in case J;

FIG. 14C presents a time chart of the longitudinal/lateral direction reaction force control implemented in case J;

FIG. 15A shows a change in the obstacle conditions around the subject vehicle in case K;

FIG. 15B presents a time chart of the longitudinal/lateral direction reaction force control implemented in case K;

FIG. 16A shows a change in the obstacle conditions around the subject vehicle in case L;

FIG. 16B presents a time chart of the longitudinal/lateral direction reaction force control implemented in case L;

FIG. 18 is a chart showing the reaction force control timing in accordance with the changes in the information communication mode achieved in a second embodiment;

FIG. 20 is a chart showing the reaction force control timing in accordance with the changes in the information communication mode achieved in the second embodiment.

DESCRIPTION OF THE PREFERRED EMBODIMENTS

FIRST EMBODIMENT

Figure 1:
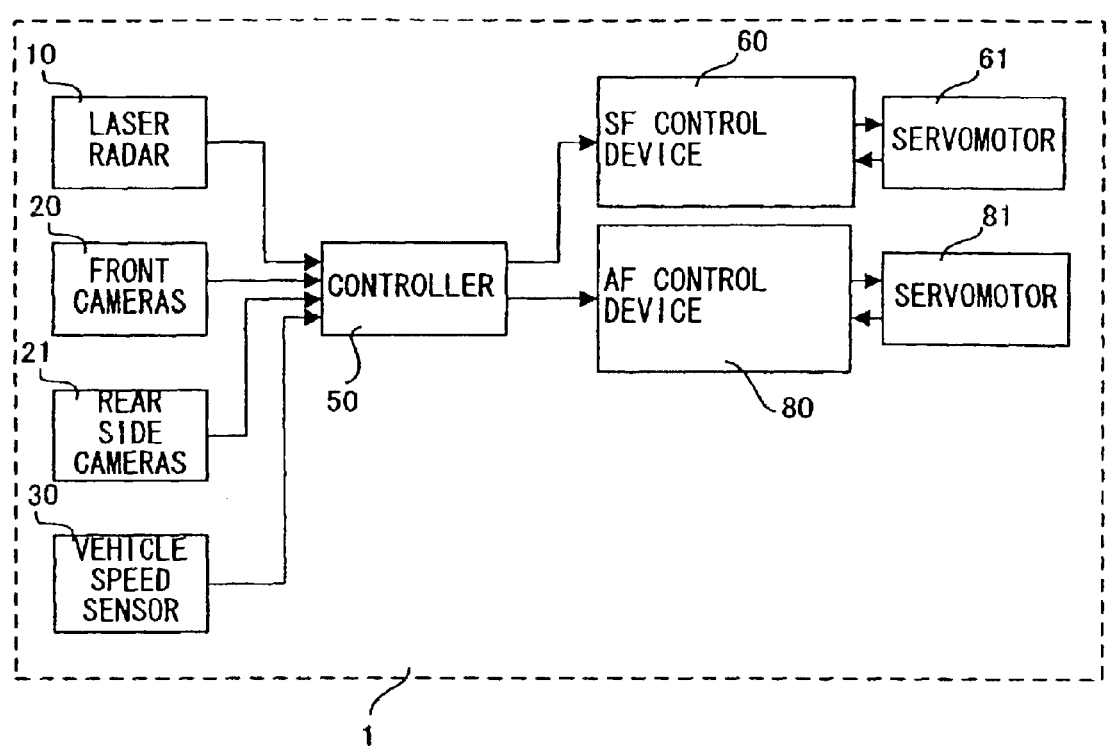
FIG. 1 shows the structure of the driving assist system achieved in a first embodiment of the present invention.
Figure 2:
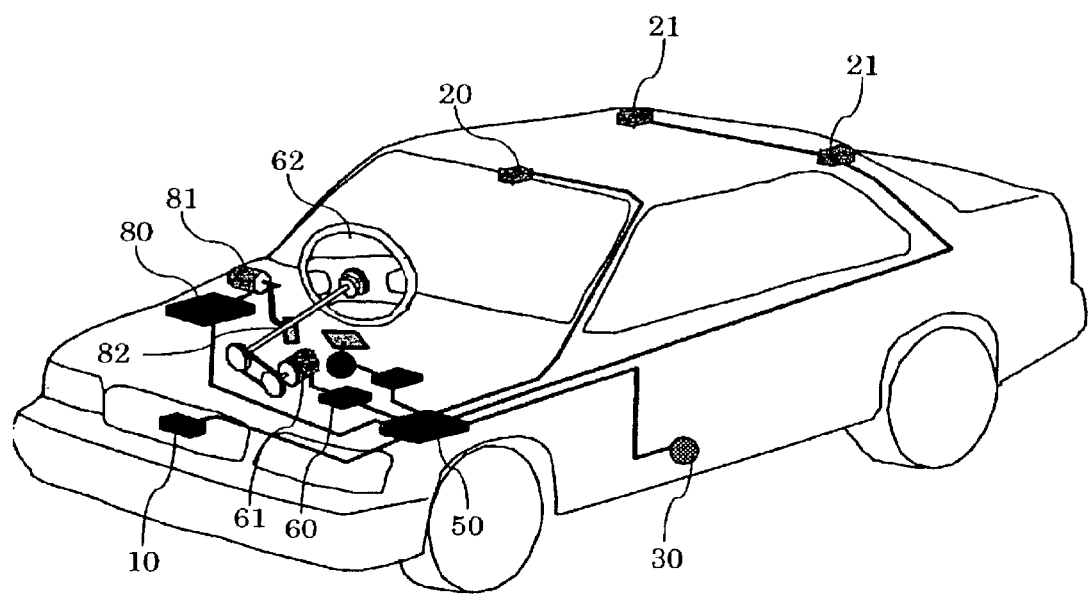
FIG. 2 shows the structure of a vehicle equipped with the driving assist system shown in FIG. 1.

The driving assist system achieved in the first embodiment of the present invention is now explained in reference to the drawings. FIG. 1 shows the system configuration of a driving assist system 1 for a vehicle (a subject vehicle) achieved in the first embodiment. FIG. 2 illustrates the structure of the vehicle equipped with the driving assist system 1.

First, the structure of the driving assist system 1 is explained.

A laser radar 10, which may be mounted at the front grille or the bumper of the subject vehicle, scans a forward region of the subject vehicle by propagating infrared pulses along the horizontal direction. The laser radar 10 measures reflected waves of the infrared pulses reflected from a plurality of reflecting objects (normally the rear ends of the preceding vehicles) present forward of the subject vehicle and detects a distance (a vehicle distance) to each of the preceding vehicles and the direction along which the preceding vehicle is present based upon the length of time that the reflected waves take to reach the laser radar 10. The vehicle distances and the directions thus detected are output to a controller 50. It is to be noted that the direction along which an object is present to the front of the vehicle is expressed as the relative angle to the subject vehicle in the embodiment. The forward region scanned by the laser radar 10 ranges at approximately 6 degrees to each side of the longitudinal centerline the subject vehicle and the laser radar 10 detects objects present within this range.

A front camera 20 may be a compact CCD camera or CMOS camera mounted at the top of the windshield. The front camera 20 captures an image of the forward region to detect the road conditions ahead of the subject vehicle as an image and outputs the image signals to the controller 50. The detection range of the front camera 20 is approximately 30 degrees to each side of the longitudinal centerline of the subject vehicle along the horizontal direction, and the landscape of the road ahead contained in this range is taken in as an image. The front camera 20 outputs the detected image of the road ahead of the subject image to the controller 50.

Rear side cameras 21 are constituted of two compact CCD cameras or CMOS cameras mounted to upper portions of the left and right sides of the rear window. The rear side cameras 21 each detect the road conditions behind the subject vehicle on either side and, more specifically, the conditions of an adjacent lane, as an image. The rear side cameras 21 output the detected images to the controller 50.

A vehicle speed sensor 30 detects the traveling speed of the subject vehicle based upon the rotational speed of the wheels or the like and outputs the detected vehicle speed to the controller 50.

The controller 50, which is constituted of a CPU and CPU peripheral components such as a ROM and a RAM, executes the overall control of the driving assist system 1 by adopting a specific software mode in the CPU. The controller 50 detects the driving environment of the subject vehicle, i.e., obstacle conditions around the subject vehicle, based upon the vehicle speed input from the vehicle speed sensor 30, the distance information input from the laser radar 10 and the image information on the conditions around the subject vehicle input from the front camera 20 and the rear side cameras 21. It is to be noted that the controller 50 detects the obstacle conditions around the subject vehicle by executing image processing on the image information provided by the front camera 20 and the rear side cameras 21.

The obstacle conditions around the subject vehicle include the vehicle distance to a preceding vehicle traveling ahead of the subject vehicle, the presence/absence of another vehicle traveling on an adjacent lane and the proximity of the subject vehicle to the other vehicle, the lateral position of the subject vehicle relative to a lane line (white line) or a guardrail (the relative position and the relative angle), and the shape of the lane line or the guardrail.

The controller 50 calculates a risk potential of the subject vehicle in relation to the individual obstacles based upon the detected obstacle conditions, and executes steering reaction force control and accelerator pedal reaction force control in correspondence to the calculated risk potential as detailed later.

A steering reaction force control device (a SF control device) 60, which is built into the steering system of the subject vehicle, controls the torque generated at a servomotor 61 in response to a command issued by the controller 50. At the servomotor 61, the torque to be generated is controlled in conformance to a command value output from the SF control device 60 and thus, the level of the steering reaction force generated when the driver operates a steering wheel 62 can be controlled as desired through the servomotor 61.

An accelerator pedal reaction force control device (an AF control device) 80 controls the torque generated at a servomotor 81 built into a link mechanism for an accelerator pedal 82 in response to a command issued by the controller 50. At the servomotor 81, the reaction force to be generated is controlled in conformance to a command value output from the AF control device 80 and thus, the level of reaction force generated when the driver operates the accelerator pedal 82 can be controlled through the servomotor 81 as desired.

Next, the operations implemented by the driving assist system 1 in the first embodiment are explained. The following description summarily outlines the operation.

Based upon the detection signals provided by the laser radar 10, the front camera 20, the rear side cameras 21 and the vehicle speed sensor 30, the controller 50 recognizes the obstacle conditions around the subject vehicle such as the traveling speed of the subject vehicle, the positions and the traveling directions of other vehicles present in forward area of the subject vehicle and on adjacent lanes relative to the subject vehicle and the position of the subject vehicle relative to a lane line or a guardrail. The controller 50 determines the risk potential of the subject vehicle in correspondence to each obstacle based upon the obstacle conditions thus recognized. Then, based upon a longitudinal component and a lateral component of the risk potential corresponding to each obstacle, the controller 50 calculates a longitudinal direction reaction force control quantity and a lateral direction reaction force control quantity.

The longitudinal direction reaction force control quantity thus calculated is output to the AF control device 80 as a longitudinal direction reaction force control command value to be used for the longitudinal direction reaction force control. The AF control device 80 controls the servomotor 81 in conformance to the reaction force control command value input thereto and adjusts the accelerator pedal reaction force characteristics (the AF characteristics). As a result, the extent to which the driver actually operates the accelerator pedal 82 is controlled to an appropriate value. It is to be noted that the AF characteristics, i.e., the normal reaction force characteristics, that are achieved when no accelerator pedal reaction force control is implemented are set so that, for instance, the accelerator pedal reaction force increases linearly as the extent to which the accelerator pedal 82 is operated increases. The normal reaction force characteristics may be achieved by using a torsion spring (not shown) provided at the rotational center of the accelerator pedal 82.

The lateral direction reaction force control quantity that has been calculated is output to the SF control device 60 as a lateral direction reaction force control command value to be used for the lateral direction reaction force control. The SF control device 60 adjusts the steering reaction force characteristics (the SF characteristics) by controlling the servomotor 61 in conformance to the reaction force control command value input thereto. As a result, control is implemented so as to ensure that the actual steering angle at which the driver steers the subject vehicle achieves a desirable steering angle.

As described above, the driving assist system 1 achieved in the first embodiment communicates the risk potential present in the longitudinal direction and the risk potential present in the lateral direction relative to the subject vehicle to the driver to assist the driver in accelerating/decelerating and steering the subject vehicle by controlling the reaction forces generated when the driver operates the accelerator pedal 82 and the steering wheel 62. However, if the longitudinal direction reaction force control and the lateral direction reaction force control are implemented simultaneously for the subject vehicle, the driver cannot accurately distinguish the longitudinal risk potential from the lateral risk potential. In addition, there is possibility that the vehicle behavior becomes unstable under such circumstances.

Accordingly, in the first embodiment of the present invention, a time lag is created between the longitudinal direction reaction force control and the lateral direction reaction force control in conformance to the driving environment (the obstacle conditions) surrounding the subject vehicle so that the longitudinal risk potential and the lateral risk potential are communicated or transmitted to the driver at different time points.

FIG. 3 shows the execution timing (output timing) of the longitudinal direction reaction force control and the lateral direction reaction force control in accordance with the change in the obstacle conditions around the subject vehicle, i.e., the change in the information conveyance mode implemented by the reaction force control. The following is an explanation of the reaction force control executed for each case of the status transition of the information conveyance mode.

Case A: no information conveyance→longitudinal information conveyance

For instance, if there are no obstacles present around the subject vehicle and then a preceding vehicle is detected in the lane in which the subject vehicle is traveling, longitudinal direction reaction force control is executed in correspondence to the risk potential posed by the preceding vehicle as soon as the preceding vehicle is detected.

A risk potential in a longitudinal direction (RPlongitudinal) in relation to a preceding vehicle may be calculated by using (expression 1) presented below. The RPlongitudinal can be calculated based upon, for instance, a time-to-contact (TTC) representing the margin of time remaining before the subject vehicle comes into contact with the preceding vehicle and a time headway (THW) between the subject vehicle and the preceding vehicle.

$$RP\text{longitudinal} = a/THW + b/TTC \qquad \text{(expression 1)}$$

The constants a and b in the mathematical expression above are parameters used to set appropriate weight to the THW and the TTC. The constants a and b are set in advance so as to satisfy a<b (e.g., a=1 and b=8).

The TTC is a value that indicates how many seconds after the subject vehicle will come into contact with the preceding vehicle if the current traveling state is sustained, i.e., if the relative vehicle speed Vr remains constant. The TTC may be calculated through (expression 2) presented below by using the vehicle distance D to the preceding vehicle and the relative speed Vr.

$$TTC = D/Vr \qquad \text{(expression 2)}$$

The THW is a value indicating the length of time to elapse before the subject vehicle traveling at the speed Vf reaches the current position of the preceding vehicle. The THW may be calculated through (expression 3) presented below by using the vehicle distance D and the vehicle speed Vf.

$$THW = D/Vf \qquad \text{(expression 3)}$$

It is to be noted that if the subject vehicle is trailing the preceding vehicle at the subject vehicle speed Vf equal to the preceding vehicle speed Va, the preceding vehicle speed Va may be used instead of the subject vehicle speed Vf in (expression 3).

Figure 4:
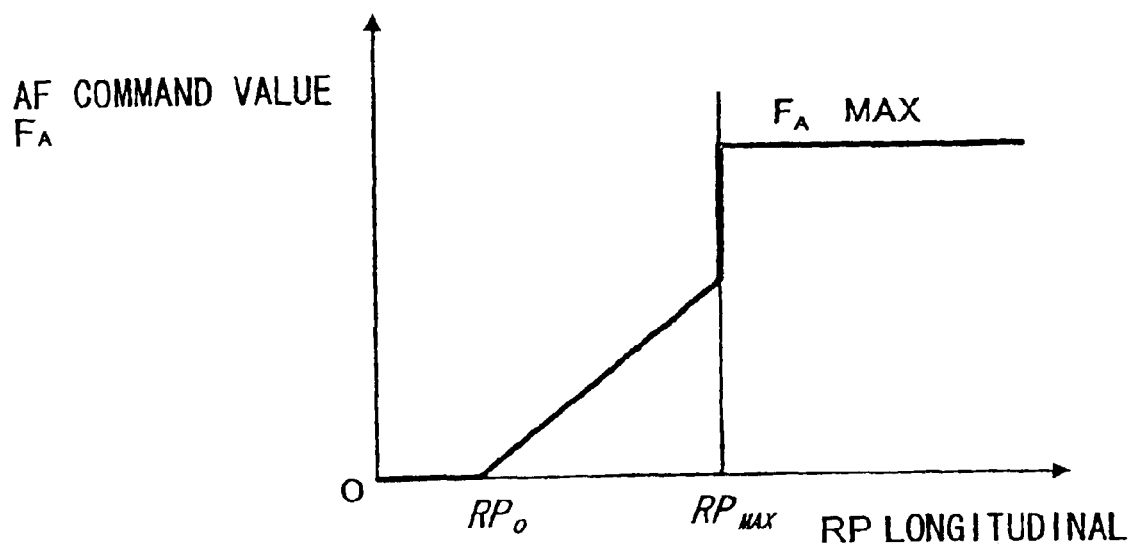
FIG. 4 shows the relationship between the longitudinal risk potential and the reaction force control command value for accelerator pedal.

FIG. 4 presents an example of a relationship that may be achieved between the RPlongitudinal and an accelerator pedal reaction force control command value (an AF control command value) FA. As shown in FIG. 4, the AF control command value FA is increased so as to generate a larger accelerator pedal reaction force as the level of the RPlongitudinal rises over the range in which the RPlongitudinal is smaller than a predetermined value RPmax. Over the range in which the RPlongitudinal is equal to or greater than the predetermined value RPmax, the AF control command value FA is fixed to a maximum FAmax so as to generate the maximum level of accelerator pedal reaction force.

The controller 50 outputs the longitudinal direction reaction force control command value FA calculated for the longitudinal direction reaction force control to the AF control device 80 and starts accelerator pedal reaction force control as soon as the preceding vehicle is detected.

Case B: No Information Conveyance→Lateral Information Conveyance

For instance, if there are no obstacles present around the subject vehicle and then a white line (a lane marker) or a side wall along the subject vehicle is detected, lateral direction reaction force control is executed in correspondence to the risk potential posed by the obstacle present in the lateral direction as soon as the obstacle is detected.

A risk potential in a lateral direction (RPlateral) relative to an obstacle present along the lateral direction relative to the subject vehicle may be calculated based upon, for instance, the position of the subject vehicle relative to the obstacle. If a side wall is detected as an obstacle, the reciprocal of the distance DL between the subject vehicle and the side wall taken along the lateral direction relative to the subject vehicle may be used as the RPlateral (RPlateral=1/DL).

Figure 5:
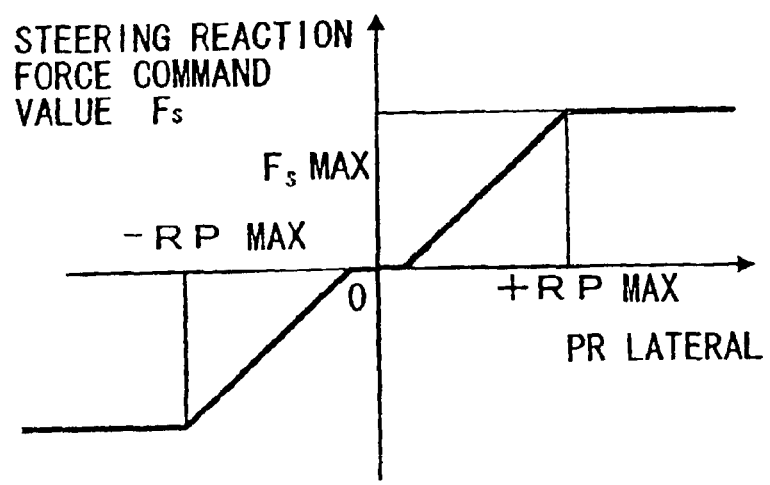
FIG. 5 shows the relationship between the lateral risk potential and the SF control command value.

FIG. 5 presents an example of a relationship that may be achieved between the RPlateral and a steering reaction force control command value (a SF control command value) FS. indicates that the risk potential is present to the right and that the RPlateral in the negative range indicates that the risk potential is present to the left relative to the subject vehicle in FIG. 5.

As shown in FIG. 5, the SF control command value FS is set so as to raise the steering reaction force along the direction in which the steering wheel 62 is reset to the neutral position as the level of the RPlateral increases over the range in which the leval of the RPlateral is smaller than a predetermined value RPmax. If the RPlateral is not within the ±RPmax range, the SF control command value is set to the maximum value FSmax so as to reset the steering wheel 62 to the neutral position promptly.

The controller 50 outputs the calculated SF control command value FS to the SF control device 60 and starts the steering reaction force control as soon as the obstacle is detected along the lateral direction.

Case C: longitudinal information conveyance→no information conveyance

For instance, if a preceding vehicle having been present ahead of the subject vehicle on the same lane is no longer detected, the longitudinal direction reaction force control is terminated, i.e., the longitudinal direction reaction force control ends, as soon as the preceding vehicle is no longer detected.

Case D: lateral information conveyance→no information conveyance

For instance, an obstacle such as a lane marker or a side wall along the subject vehicle lane having been detected is no longer detected, the lateral direction reaction force control is terminated as soon as the lane marker or the side wall is no longer detected.

If the obstacle conditions corresponding to a single direction, i.e., either the longitudinal direction or the lateral direction, as in cases A~D, the change in the obstacle conditions is promptly communicated to the driver as soon as the change takes place. In cases E~L explained below, on the other hand, changes in the obstacle conditions occur at the same time along the longitudinal direction and the lateral direction. In cases E~L, the reaction force control is implemented by creating a time lag between the longitudinal direction reaction force control and the lateral direction reaction force control.

Case E: no information conveyance→longitudinal+lateral information conveyance

FIGS. 6A~6C show specific examples of obstacle conditions that may exist in case E. FIG. 6D is a time chart of the reaction force control executed along the longitudinal direction and the lateral direction. A target obstacle for which the longitudinal+lateral direction reaction force control is implemented may be, for instance, a parked vehicle present diagonally ahead of the subject vehicle, as shown in FIG. 6A. It may instead be a guardrail provided at a bend in the road, as shown in FIG. 6B, or there may be a plurality of target obstacles such as a preceding vehicle present in the lane into which the subject vehicle is entering and another vehicle (adjacent vehicle) that travels in a lane adjacent to the lane into which the subject vehicle is entering, as shown in FIG. 6C. It is assumed that as soon as such obstacles enter the detection range of the sensors and the cameras installed at the subject vehicle, the target obstacles present along the longitudinal and lateral directions become detected.

The controller 50 calculates the risk potential corresponding to a target obstacle detected by the laser radar 10, the front camera 20 or the like.

For instance, if a parked vehicle present diagonally ahead of the subject vehicle is detected, as shown in FIG. 6A, the TTC corresponding to the parked vehicle is calculated through (expression 2) described earlier, and the reciprocal (1/TTC) of the TTC is used as a risk potential in the longitudinal+lateral directions (RPdiagonal) relative to the parked vehicle. Then, the controller 50 divides the RPdiagonal in the longitudinal+lateral directions into a longitudinal component (RPlongitudinal) and a lateral component (RPlateral) through (expression 4) and (expression 5) presented below by using the relative angle θr of the parked vehicle to the subject vehicle.

$$RP\text{longitudinal}=RP3 \times \cos \theta r \quad \text{(expression 4)}$$

$$RP\text{lateral}=RP3 \times \sin \theta r \quad \text{(expression 5)}$$

If a guardrail installed at a bend in the road into which the subject vehicle is about to enter is detected, as shown in FIG. 6B, too, the RPlongitudinal and the RPlateral can be calculated through (expression 2), (expression 4) and (expression 5).

If there is a preceding vehicle ahead of the subject vehicle having changed lanes and there is an adjacent vehicle traveling alongside in a lane adjacent to the lane into which the subject vehicle is entering, as shown in FIG. 6C, the RPlongitudinal and the RPlateral are calculated separately. The RPlongitudinal relative to the preceding vehicle is calculated through (expression 1) explained earlier. The RPlateral of the adjacent vehicle may be calculated as the reciprocal of the relative distance DL between the subject vehicle and the adjacent vehicle taken along the lateral direction.

The controller 50 calculates the AF control command value FA in correspondence to the RPlongitudinal that has been calculated, as shown in FIG. 4. In addition, the controller 50 calculates the SF control command value FS in correspondence to the RPlateral that has been calculated, as shown in FIG. 5. Then, the controller 50 outputs the calculated AF control command value FA and SF control command value FS to the AF control device 80 and the SF control device 60 respectively.

At this time, a command for the lateral direction reaction force control and a command for the longitudinal direction reaction force control are output by creating a time lag between the commands. More specifically, the controller 50 outputs the longitudinal direction reaction force control command to the AF control device 80 as soon as the target obstacle is detected (t=te). Then, the controller 50 outputs the lateral direction reaction force control command to the SF control device 60 when a predetermined length of time ΔT elapses following the detection of the target obstacle at the time point t=te.

Thus, the accelerator pedal reaction force control is started first, and then the steering reaction force control is started after the vehicle speed is lowered by prompting the driver to reduce an operation amount of the accelerator pedal 82 in case E. As a result, the response of the driver's steering operation to the steering reaction force control is optimized, thereby stabilizing the behavior of the subject vehicle.

Case F: longitudinal information conveyance→longitudinal+lateral information conveyance FIGS. 7A and 7B show specific examples of obstacle conditions that may exist in case F. FIG. 7C is a time chart of the reaction force control executed along the longitudinal direction and the lateral direction. In case F, a target obstacle posing a risk potential along both the longitudinal direction and the lateral direction is detected while a target obstacle is already present along the longitudinal direction within the detection area around the subject vehicle. More specifically, in case F, a parked vehicle may be detected diagonally ahead of the subject vehicle with a preceding vehicle present ahead in the lane in which the subject vehicle is traveling, as shown in FIG. 7A, or the subject vehicle may enter a bend with a preceding vehicle present ahead and a guardrail installed at the bend may be detected, as shown in FIG. 7B.

As the target obstacle is detected along the longitudinal+ lateral directions (t=tf), the controller 50 calculates the risk potential of the target obstacle. It is to be noted that the controller 50 has been executing the accelerator pedal reaction force control in correspondence to the RPlongitudinal relative to the preceding vehicle prior to the detection of the longitudinal+lateral obstacle at the time point t=tf. The RPlongitudinal of the preceding vehicle may be calculated through (expression 1) explained earlier.

The RPdiagonal relative to the parked vehicle or the guardrail at the bend detected as the longitudinal+lateral obstacle is calculated by using (expression 2). Then, the calculated RPdiagonal is divided into a longitudinal component and a lateral component through (expression 4) and (expression 5). Thus, the RPlongitudinal following the time point t=tf is the sum of the risk potential corresponding to the preceding vehicle and the longitudinal component of the RPdiagonal corresponding to the longitudinal+lateral target obstacle. It is to be noted that the RPlateral is constituted of the lateral component of the RPdiagonal corresponding to the longitudinal+lateral target obstacle.

The controller 50 calculates an AF control command value FA and a SF control command value FS in correspondence to the RPlongitudinal and RPlateral having been calculated, as shown in FIGS. 4 and 5. Then, the calculated AF control command value FA and SF control command value FS are output to the AF control device 80 and the SF control device 60 respectively.

During this process, the controller 50 outputs a longitudinal direction reaction force control command to the AF control device 80 as soon as the longitudinal+lateral target obstacle is detected at the time point t=tf, as shown direction reaction force control command to the SF control device 60 by allowing a predetermined length of time lag ΔT following the detection of the target obstacle (t=tf). It is to be noted that the accelerator pedal reaction force control has been executed in correspondence to the longitudinal target obstacle (the preceding vehicle) prior to the time point t=tf, as shown in FIG. 7C. Thus, the accelerator pedal reaction force control executed after the time point t=tf is updated by adding the longitudinal direction reaction force control quantity corresponding to the longitudinal+lateral target obstacle to the longitudinal direction reaction force control quantity corresponding to the preceding vehicle.

As described above, the accelerator pedal reaction force control is started or updated first at the time point t=tf, and then the steering reaction force control is started after the vehicle speed is lowered by prompting the driver to reduce the operation amount of the accelerator pedal 82 in case F. As a result, the response of the driver's steering operation to the steering reaction force control is optimized, thereby stabilizing the behavior of the subject vehicle.

Figure 8B:
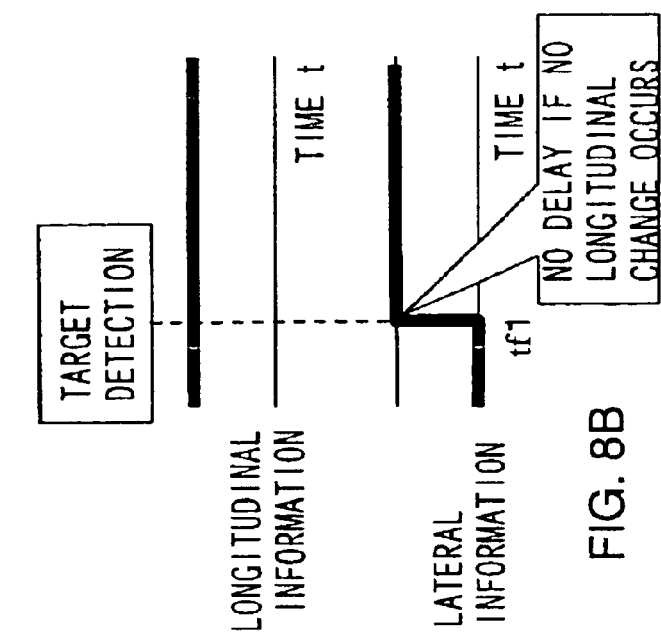
FIG. 8B presents a time chart of the longitudinal/lateral direction reaction force control implemented in case F.
Figure 8A:
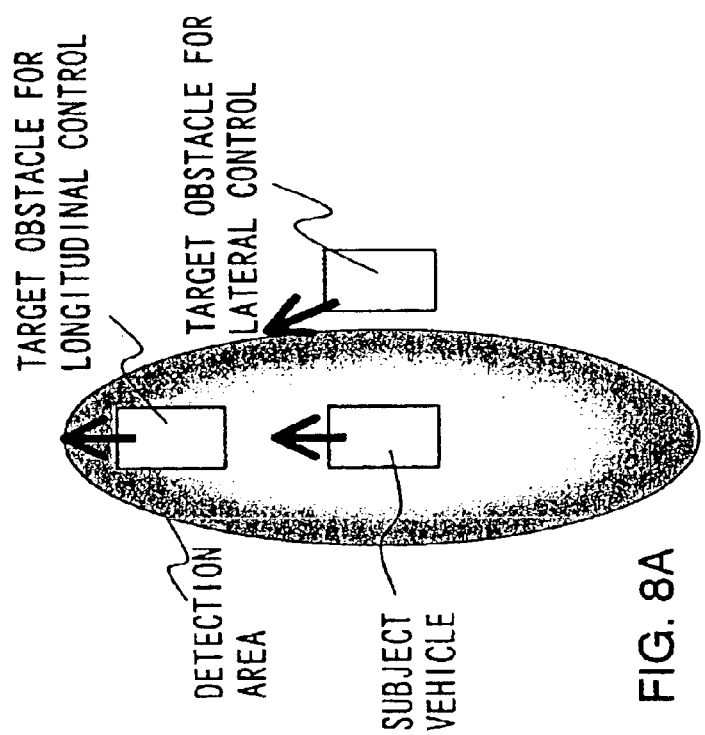
FIG. 8A shows a change in the obstacle conditions around the subject vehicle in case F.

It is to be noted that even if longitudinal+lateral target obstacles become newly detected when a longitudinal target obstacle has already been detected, there may be no change in the state over the longitudinal target obstacle after the shift in the conditions in case F. In such a case, the lateral direction reaction force control is started without a delay. FIGS. 8A and 8B respectively present a specific example of such obstacle conditions and an example of a reaction force control time chart.

If another vehicle switches lanes and moves to the side of the subject vehicle while a preceding vehicle is present within the detection area, as shown in FIG. 8A, the reaction force control shifts from the longitudinal direction reaction force control to the longitudinal+lateral direction reaction force control. However, no change has occurred in the state of the preceding vehicle and the RPlongitudinal remains unchanged. Accordingly, the controller 50 executes the accelerator pedal reaction force control with regard to the preceding vehicle continuously, as shown in FIG. 8B. Then, as soon as the adjacent vehicle is detected alongside the subject vehicle at a time point t=tf1, the controller 50 starts the steering reaction force control in correspondence to the RPlateral relative to the adjacent vehicle. It is to be noted that if the other vehicle switches lanes to move diagonally ahead of the subject vehicle, the RPlongitudinal changes and, accordingly, the steering reaction force control is started with a delay.

Case G: lateral information conveyance→longitudinal+ lateral information conveyance FIGS. 9A and 9B show specific examples of obstacle conditions that may exist in case G. FIG. 9C is a time chart of the reaction force control executed along the longitudinal direction and the lateral direction. In case G, a target obstacle posing a risk potential along both the longitudinal direction and the lateral direction is detected while a target obstacle is already present along the lateral direction within the detection area around the subject vehicle. More specifically, in case G, a parked vehicle may be detected diagonally ahead of the subject vehicle with a wall present along the side of the subject vehicle, as shown in FIG. 9A, or a lane marker may already be present as the subject vehicle enters a bend and then a lane marker running along the bend may be detected, as shown in FIG. 9B.

The controller 50 calculates the risk potential corresponding to each obstacle upon the detection of the longitudinal+lateral target obstacle (t=tg). It is to be noted that prior to the time point t=tg, the controller 50 has been executing steering reaction force control in correspondence to a RPlateral calculated for the wall or the lane marker. As the parked vehicle or the lane marker extending along the bend is detected at the time point t=tg, the controller 50 calculates the RPdiagonal by using (expression 2). In addition, it divides the calculated RPdiagonal into a longitudinal component and a lateral component through (expression 4) and (expression 5). Thus, the RPlateral following the time point t=tg is the sum of the risk potential corresponding to the wall or the lane marker and the lateral component of the RPdiagonal posed by the longitudinal+lateral target obstacle. It is to be noted that the RPlongitudinal is constituted of the longitudinal component of the RPdiagonal posed by the longitudinal+lateral target obstacle.

The controller 50 calculates an AF control command value FA and a SF control command value FS in correspondence to the RPlongitudinal and RPlateral having been calculated, as shown in FIGS. 4 and 5. Then, the calculated AF control command value FA and SF control command value FS are output to the AF control device 80 and the SF control device 60 respectively.

During this process, the controller 50 outputs a longitudinal direction reaction force control command to the AF control device 80 as soon as the longitudinal+lateral target obstacle is detected at the time point t=tg, as shown in FIG. 9C. Then, the controller 50 outputs a lateral direction reaction force control command to the SF control device 60 by allowing a predetermined length of time lag $\Delta T$ following the time point t=tg. It is to be noted that the steering reaction force control has been executed in correspondence to the lateral target obstacle (the wall or the lane marker) prior to the detection of the longitudinal+lateral target obstacle at the time point t=tg, as shown in FIG. 9C. Accordingly, the controller 50 starts or updates the steering reaction force control when the predetermined length of time $\Delta T$ elapses following the time point t=tg by adding the lateral direction reaction force control quantity corresponding to the longitudinal+lateral target obstacle to the reaction force control quantity corresponding to the obstacle already present in the lateral direction.

As described above, the accelerator pedal reaction force control is started first at the time point t=tg, and then the steering reaction force control is started after the vehicle speed is lowered by prompting the driver to reduce the operation amount of the accelerator pedal 82 in case G. As a result, the response of the driver's steering operation to the steering reaction force control is optimized, thereby stabilizing the behavior of the subject vehicle.

Figure 10B:
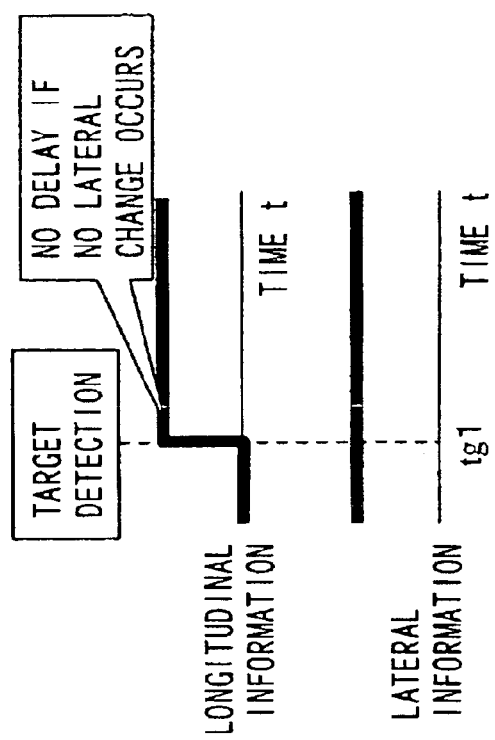
FIG. 10B presents a time chart of the longitudinal/lateral direction reaction force control implemented in case G.
Figure 10A:
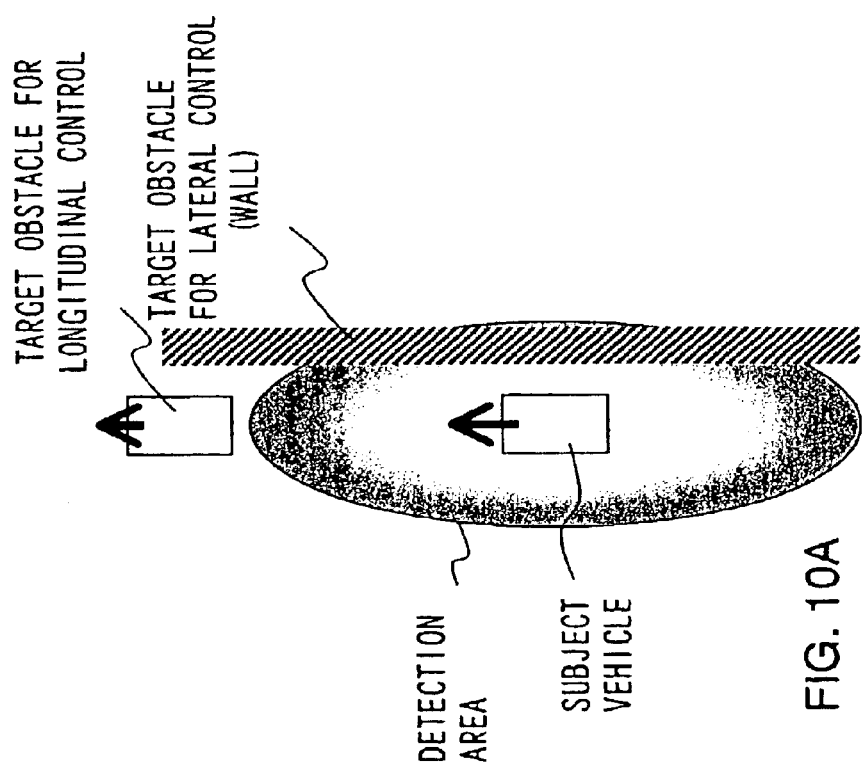
FIG. 10A shows a change in the obstacle conditions around the subject vehicle in case G.

It is to be noted that even if longitudinal+lateral target obstacles become newly detected when a lateral target obstacle has already been detected, there may be no change in the state of the lateral target obstacle after the shift in the conditions in case G. In such a case, the lateral direction reaction force control is started without a delay. In other words, the lateral direction reaction force control is not updated under such circumstances. FIGS. 10A and 10B respectively present a specific example of such obstacle conditions and an example of a reaction force control time chart.

If a preceding vehicle is detected ahead in the lane in which the subject vehicle is traveling while the wall along the vehicle lane is present within the detection area, as shown in FIG. 10A, the reaction force control shifts from the lateral direction reaction force control to the longitudinal+lateral direction reaction force control. However, there has been no change in the state of the wall and the RPlateral remains unchanged. Accordingly, the controller 50 executes the steering reaction force control continuously, as shown in FIG. 10B. And, as soon as the preceding vehicle is detected at a time point t=tg1, the controller 50 starts the accelerator pedal reaction force control in correspondence to the RPlongitudinal posed by the preceding vehicle.

Case H: longitudinal+lateral information conveyance→ no information conveyance

FIGS. 11A and 11B show specific examples of obstacle conditions that may exist in case H. FIG. 11C is a time chart of the reaction force control executed along the longitudinal direction and the lateral direction. In case H, a condition shift occurs from conditions under which a longitudinal+lateral target obstacle is present within the detection area around the subject vehicle to conditions under which no target obstacle is detected. More specifically, in case H, a parked vehicle present diagonally ahead of the subject vehicle may move further away from the subject vehicle, as shown in FIG. 11A, or the subject vehicle may move away from a guardrail installed at a bend, as shown in FIG. 11B.

The controller 50 calculates the RPdiagonal corresponding to the longitudinal+lateral target obstacle by using (expression 2) and executes the accelerator pedal reaction force control and the steering reaction force control in conformance to the longitudinal component and the lateral component of the RPdiagonal. Once the target obstacle is no longer detected at a time point t=th, the controller 50 stops the output of the control command values to the AF control device 80 and the SF control device 60. At this time, the controller 50 ends the steering reaction force control as soon as the target obstacle is no longer detected at the time point t=th and then ends the accelerator pedal reaction force control when the predetermined length of time $\Delta T$ elapses following the time point t=th, as shown in FIG. 11C.

As described above, the steering reaction force control is first terminated at the time point t=th to teach the driver that the driver's steering operation is now free and then the accelerator pedal reaction force control terminated to free the accelerator pedal operation by the driver. Since the control on the accelerator pedal operation remains in effect until the steering operation becomes free in this manner, the behavior of the vehicle is stabilized.

Figure 12B:
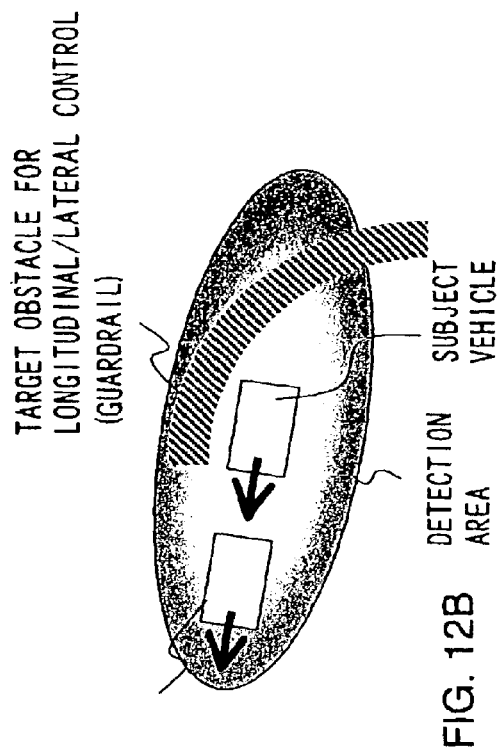
FIGS. 12A and 12B show changes in the obstacle conditions around the subject vehicle in case I.
Figure 12C:
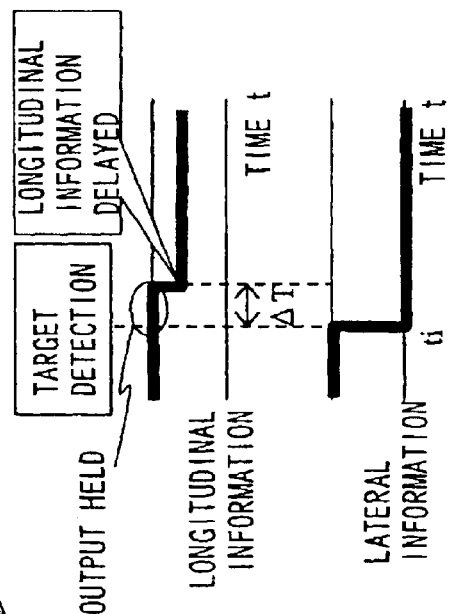
FIG. 12C presents a time chart of the longitudinal/lateral direction reaction force control implemented in case I.
Figure 12A:
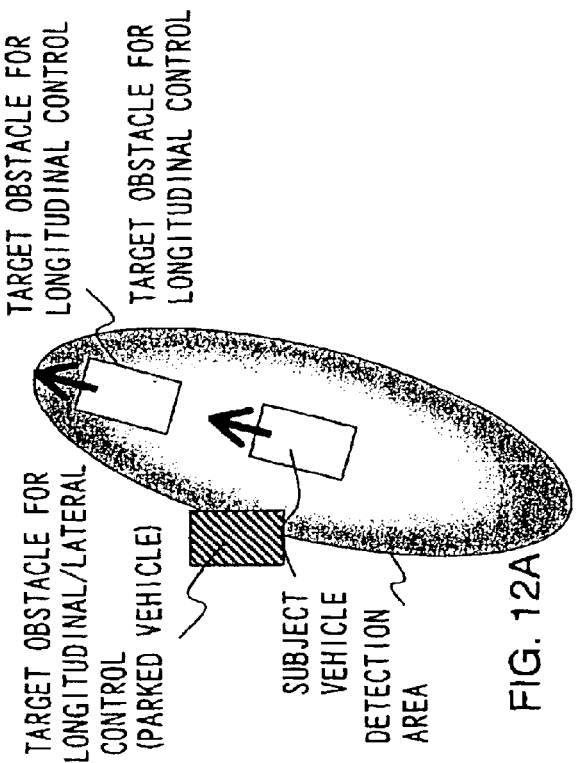

Case I: longitudinal+lateral information conveyance→ longitudinal information conveyance FIGS. 12A and 12B show specific examples of obstacle conditions that may exist in case I. FIG. 12C is a time chart of the reaction force control executed along the longitudinal direction and the lateral direction. In case I, a condition shift occurs from conditions under which longitudinal+lateral target obstacles are present within the detection area around the subject vehicle to conditions under which the lateral target obstacle is no longer detected and only the longitudinal target obstacle remains within the detection area. More specifically, in case I, of a preceding vehicle traveling ahead in the lane in which the subject vehicle is traveling and a parked vehicle present diagonally ahead of the subject vehicle, the parked vehicle may become no longer detected, as shown in FIG. 12A, or of a preceding vehicle and a guardrail present at a bend, the guardrail may become no longer detected, as shown in FIG. 12B.

The controller 50 calculates the risk potential corresponding to the preceding vehicle by using (expression 1). In addition, the controller 50 calculates the longitudinal component and the lateral component of the RPdiagonal posed by the parked vehicle or the guardrail through (expression 2), (expression 4) and (expression 5). Then, the controller 50 executes the accelerator pedal reaction force control and the steering reaction force control in conformance to the RPlongitudinal and the RPlateral that have been calculated.

Once the parked vehicle or the guardrail is no longer detected at a time point t=ti, there is no target obstacle detected for the steering reaction force control and, accordingly, the controller 50 stops the output of the control command value to the SF control device 60. In addition, since there is now only one target obstacle, i.e., the preceding vehicle, for the accelerator pedal reaction force control, the controller 50 outputs an AF control command value FA corresponding to the risk potential posed by the preceding vehicle alone to the AF control device 80.

During this process, the steering reaction force control is terminated as soon as the longitudinal+lateral target obstacle is no longer detected at the time point t=ti, as shown in FIG. 12C. In addition, the contents of the accelerator pedal reaction force control are updated to correspond to the longitudinal target obstacle alone when the predetermined length of time ΔT elapses following the time point t=ti.

As described above, the steering reaction force control is first terminated at the time point t=ti to indicate to the driver that the driver's steering operation is now free and then the accelerator pedal reaction force control is updated. Since the control on the accelerator pedal operation remains in effect until the steering operation becomes free in this manner, the behavior of the subject vehicle is stabilized.

Figure 13B:
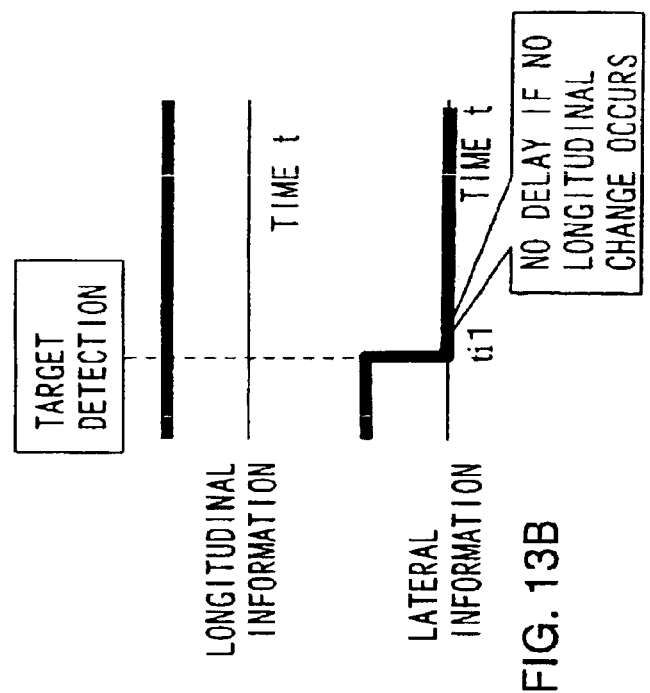
FIG. 13B presents a time chart of the longitudinal/lateral direction reaction force control implemented in case I.
Figure 13A:
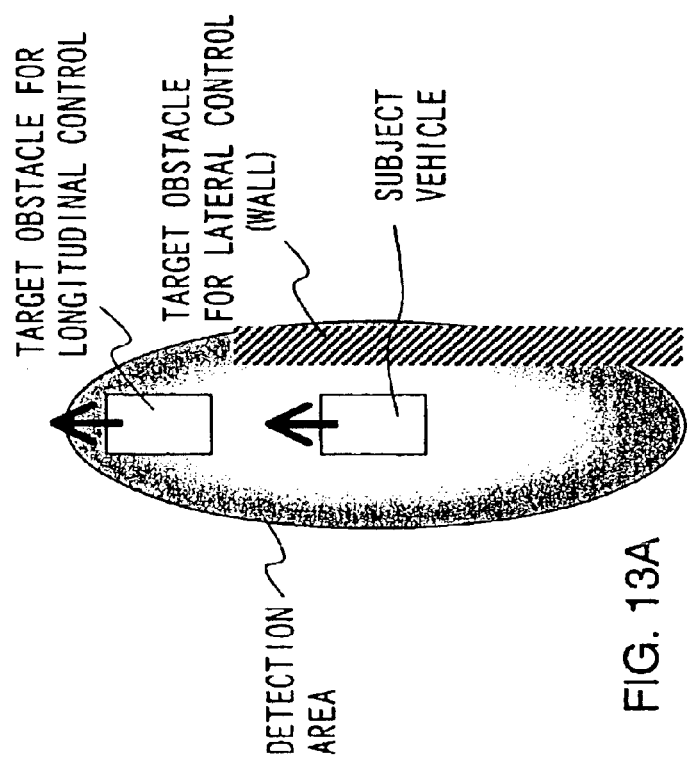
FIG. 13A shows a change in the obstacle conditions around the subject vehicle in case I.

It is to be noted that even when a condition shift occurs from conditions under which longitudinal+lateral direction target obstacles are detected to conditions under which only a longitudinal target obstacle is detected, the state of the longitudinal target obstacle may remain unchanged after the shift in conditions in case I. In such a case, the longitudinal direction reaction force control is updated without delay, i.e., the longitudinal direction reaction force control is not changed at all. FIGS. 13A and 13B respectively present a specific example of such obstacle conditions and an example of a reaction force control time chart.

As the wall having been present along the lane together with the preceding vehicle within the detection area is no longer detected, as shown in FIG. 13A, the reaction force control shifts from the longitudinal+lateral direction reaction force control to the longitudinal direction reaction force control. However, there has been no change in the state of the preceding vehicle, and the risk potential in the longitudinal direction remains unchanged. Accordingly, the controller 50 ends the steering reaction force control as soon as the wall is no longer detected at a time point t=ti1 while continuously executing the accelerator pedal reaction force control, as shown in FIG. 13B.

Case J: longitudinal+lateral information conveyance→lateral information conveyance FIGS. 14A and 14B show specific examples of obstacle conditions that may exist in case J. FIG. 14C is a time chart of the reaction force control executed along the longitudinal direction and the lateral direction. In case J, a condition shift occurs from conditions under which longitudinal+lateral target obstacles are present within the detection area around the subject vehicle to conditions under which the longitudinal target obstacle is no longer detected and only the lateral target obstacle remains within the detection area. More specifically, in case J, of a wall present alongside the subject vehicle and another vehicle traveling diagonally ahead of the subject vehicle, the other vehicle may become no longer detected, as shown in FIG. 14A, or of an adjacent vehicle in a lane adjacent to the lane in which the subject vehicle is traveling and a guardrail installed at a bend, the guard rail may become no longer detected, as shown in FIG. 14B.

The controller 50 calculates the risk potential in the lateral direction based upon the relative distance to the wall or the adjacent vehicle at the side of the subject vehicle. In addition, the controller 50 calculates the longitudinal component and the lateral component of the RPdiagonal corresponding to the other vehicle in the adjacent lane or the guardrail by using (expression 2), (expression 4) and (expression 5). Then, the controller 50 executes the accelerator pedal reaction force control and the steering reaction force control for the longitudinal+lateral target obstacles in correspondence to the RPlongitudinal and the RPlateral that have been calculated.

As the other vehicle diagonally ahead of the subject vehicle or the guardrail is no longer detected at a time point t=tj, the wall or the adjacent vehicle becomes a sole target obstacle for the steering reaction force control. Accordingly, the controller 50 outputs a SF control command value FS corresponding to the risk potential of the lateral target obstacle alone to the SF control device 60. In addition, since any longitudinal target obstacle is no longer detected, the controller 50 stops the output of the control command value to the AF control device 80. During this process, the steering reaction force control is updated as soon as the longitudinal+lateral target obstacle is no longer detected at the time point t=tj and the accelerator pedal reaction force control is terminated when the predetermined length of time ΔT elapses following the time point t=tj, as shown in FIG. 14C.

As described above, in case J, the steering reaction force control is updated first to present or indicate that the driver's steering operation is now free and then the accelerator pedal reaction force control is terminated. Thus, since the control on the accelerator pedal operation remains in effect until the steering operation becomes free, the behavior of the subject vehicle is stabilized.

Case K: longitudinal information conveyance→lateral information conveyance

FIG. 15A shows a specific example of obstacle conditions that may exist in case K. FIG. 15B is a time chart of the reaction force control executed along the longitudinal direction and the lateral direction. In case K, a longitudinal target obstacle present within the detection area around the subject vehicle is no longer detected and, at the same time, a lateral target obstacle is detected. In the specific example of case K presented in FIG. 15A, as the subject vehicle switches lanes, the preceding vehicle having been present ahead in the lane in which the subject vehicle has been traveling is no longer detected. And at the same time, an adjacent vehicle is detected which is traveling in a lane adjacent to the lane in which the subject vehicle is now traveling after the lane change.

The controller 50 calculates the RPlongitudinal corresponding to the preceding vehicle by using (expression 1) and executes the accelerator pedal reaction force control in conformance to the calculated RPlongitudinal. As the preceding vehicle is no longer detected due to a lane change or the like at a time point t=tk, the controller 50 stops the output of the reaction force control command value FA to the AF control device 80. In addition, the controller 50 calculates the RPlateral posed by the adjacent vehicle traveling alongside the subject vehicle having changed lanes and outputs a SF control command value FS corresponding to the RPlateral to the SF control device 60. During this process, the steering reaction force control is started as soon as the lateral target obstacle is detected and the longitudinal target obstacle becomes no longer detected at the time point t=tk. The accelerator pedal reaction force control is terminated when the predetermined length of time ΔT elapses following the time point t=tk, as shown in FIG. 15B.

As described above, the accelerator pedal reaction force control is terminated after starting the steering reaction force control in case K. In this manner, the RPlateral that has newly occurred is first communicated to the driver.

Case L: lateral information conveyance→longitudinal information conveyance

FIG. 16A shows a specific example of obstacle conditions that may exist in case L. FIG. 16B is a time chart of the reaction force control executed along the longitudinal direction and the lateral direction. In case L, a lateral target obstacle present within the detection area around the subject vehicle is no longer detected and, at the same time, a longitudinal target obstacle is detected. In the specific example of case L presented in FIG. 16A, as the subject vehicle switches lanes, an adjacent vehicle is no longer detected which is traveling in a lane adjacent to the lane in which the subject vehicle has been traveling. And, at the same time, a preceding vehicle traveling ahead of the subject vehicle in the new lane is detected.

The controller 50 calculates the RPlateral posed by the adjacent vehicle traveling alongside the subject vehicle and executes the steering reaction force control in correspondence to the RPlateral. As the adjacent vehicle is no longer detected due to the lane change at a time point t=t1, the controller 50 stops the output of a SF control command value FS to the SF control device 60. In addition, the controller 50 calculates the RPlongitudinal of the preceding vehicle traveling ahead of the subject vehicle in the new lane by using (expression 1) and outputs an AF control command value FA corresponding to the RPlongitudinal thus calculated to the AF control device 80.

During this process, as soon as the lateral target obstacle is no longer detected and the longitudinal target optical is detected at the time point t=t1, the accelerator pedal reaction force control is started and the steering reaction force control is terminated when the predetermined length of time ΔT elapses following the time point t=t1.

As described above, the steering reaction force control is terminated after starting the accelerator pedal reaction force control in case L. In this manner, the new risk potential in the longitudinal direction that has newly occurred is first communicated to the driver.

Figure 17:
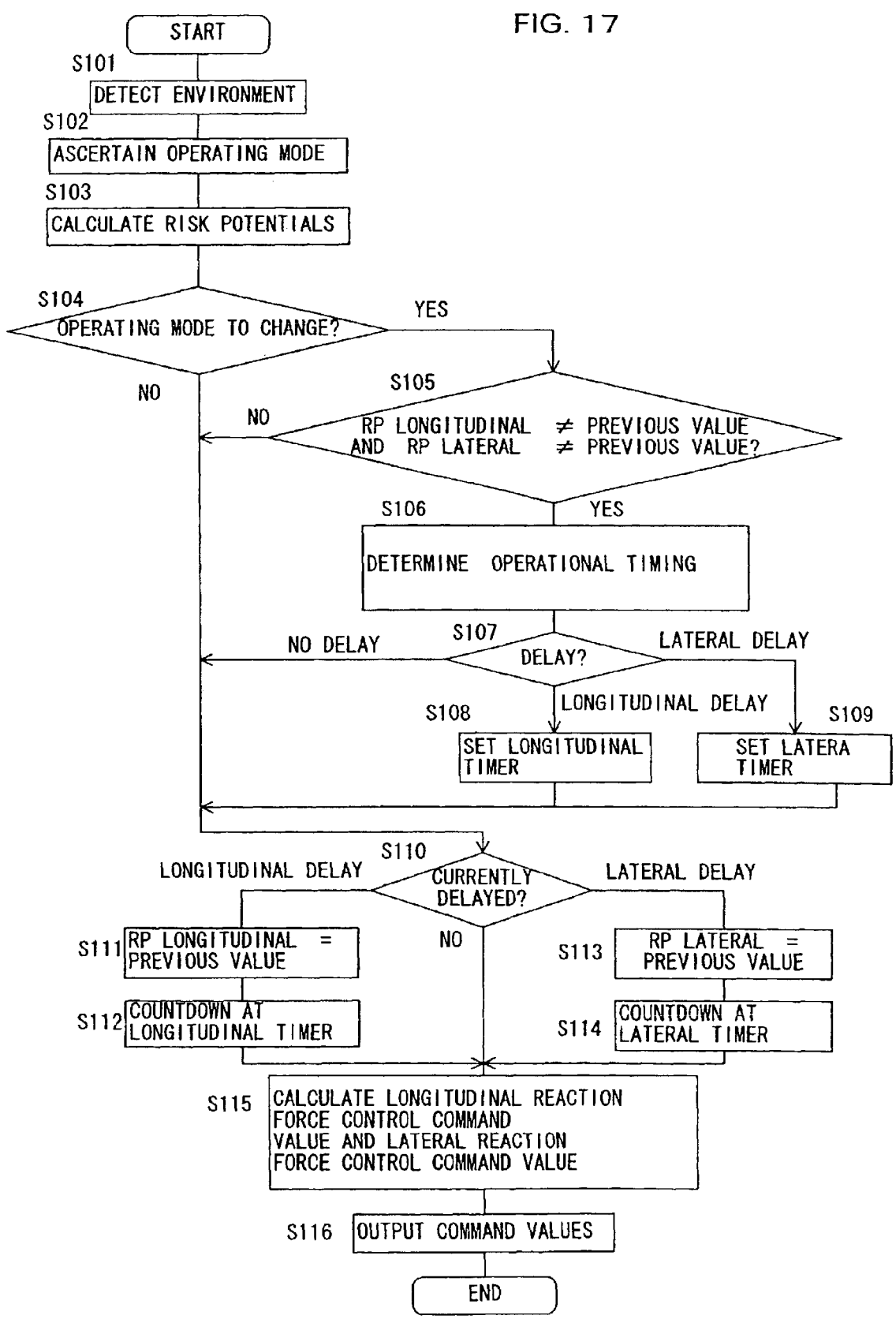
FIG. 17 presents a flowchart of the processing executed in conformance to the driving assist control program in the driving assist system in the first embodiment.

Next, the procedure of the accelerator pedal reaction force control and the steering reaction force control processing for the individual cases described above is explained in reference to FIG. 17. FIG. 17 presents a flowchart of the driving assist control processing executed by the controller 50. The processing is continuously executed at predetermined time intervals of, e.g., 50 msec time intervals.

In step S101, the controller 50 reads the driving environment detected by the laser radar 10, the front camera 20, the rear side cameras 21 and the vehicle speed sensor 30. The driving environment includes the vehicle speed Vf and the obstacle conditions. The obstacle conditions include the relative distance to a given obstacle present around the subject vehicle, the relative speed Vr and the relative angle θr. It is to be noted that previous obstacle conditions having been detected for the preceding processing and earlier processing are stored in the memory within the controller 50.

In step S102, the controller 50 makes a decision with regard to the current operating mode setting, i.e., the controller 50 makes a decision on the mode of the reaction force control currently executed. In step S103, the controller 50 calculates a risk potential corresponding to each of the obstacles present around the subject vehicle based upon the obstacle conditions detected in step S101 and calculates the RPlongitudinal and the RPlateral accordingly.

In step S104, a decision is made as to whether or not the current reaction force control mode determined in step S102 needs to be changed. If the obstacle conditions change as in any of cases A~L described above, the controller 50 determines that the reaction force control mode needs to be changed and the operation proceeds to step S105.

In step S105, the RPlongitudinal and RPlateral calculated in step S103 are compared with the previous RPlongitudinal and the RPlateral stored in the memory of the controller 50 respectively to make a decision as to whether or not the two risk potential values are both different from the previous risk potential values. If an affirmative decision is made in step S105, i.e., if it is decided that the RPlongitudinal is different from the previous value and RPlateral is different from the previous value, the operation proceeds to step S106. It is to be noted that if the obstacle conditions change only along a single direction as in cases A~D described above, or if the obstacle conditions shift as shown in FIG. 8A, FIG. 10A or FIG. 13A, only either the RPlongitudinal or the RPlateral changes and thus, a negative decision is made in step S105. If a negative decision is made in step S105, the operation proceeds to step S110.

In step S106, a specific mode of reaction force control is selected, as shown in FIG. 3, based upon the manner in which the obstacle conditions have shifted. More specifically, details of the reaction force control to be executed, i.e., whether the accelerator pedal reaction force control or the steering reaction force control is to be implemented and whether or not there should be a delay in the timing with which the reaction force control is started or terminated are determined.

In the following step S107, a decision is made as to whether or not the accelerator pedal reaction force control or the steering reaction force control is to be started or terminated with the delay. If it is decided that the accelerator pedal reaction force control is to be delayed, the operation proceeds to step S108 in which the predetermined length of time ΔT is set at a timer for the longitudinal control (not shown). If, on the other hand, it is decided that the steering reaction force control is to be delayed, the operation proceeds to step S109 to set the predetermined length of time ΔT at a timer for the lateral control (not shown). If it is decided that neither the accelerator pedal reaction force control nor the steering reaction force control is to be delayed, the operation proceeds to step S110.

In step S110, a decision is made based upon the operating states of the longitudinal timer and the lateral timer as to whether or not either the accelerator pedal reaction force control or the steering reaction force control is being delayed. If the longitudinal timer is currently in an operating state indicating that the accelerator pedal reaction force control is being delayed, the operation proceeds to step S111. In step S111, the RPlongitudinal is set to the value having been calculated during the previous processing. It is to be noted that if it is decided in the current processing to create a delay for the accelerator pedal reaction force control, the RPlongitudinal currently calculated in step S103 is used. In the following step S112, a count-down is executed at the longitudinal timer and then the operation proceeds to step S115.

If, on the other hand, it is decided in step S110 that the lateral timer is currently in an operating state and thus the steering reaction force control is being delayed, the operation proceeds to step S113. In step S113, the RPlateral is set to the value having been calculated during the previous processing. It is to be noted that if it is decided in the current processing to create a delay for the steering reaction force control, the RPlateral calculated in step S103 is used. In the following step S114, a count-down is executed at the lateral timer and then the operation proceeds to step S115.

If it is decided in step S110 that neither the accelerator pedal reaction force control nor the steering reaction force control is currently being delayed, the operation proceeds to step S115.

In step S115, the AF control command value FA and the SF control command value FS are calculated as shown in FIG. 4 and FIG. 5 in correspondence to the RPlongitudinal and the RPlateral calculated in step S103, step S111 or step S113. In step S116, the AF control command value FA and the SF control command value FS calculated in step S115 are respectively output to the AF control device 80 and the SF control device 60. The sequence of the current processing thus ends.

As described above, the following advantages are achieved in the first embodiment.

(1) In correspondence to the specific obstacle conditions existing around the subject vehicle, the controller 50 communicates or presents to the driver the RPlongitudinal present in the longitudinal direction relative to the subject vehicle as an accelerator pedal reaction force and communicates or presents the RPlateral present in the lateral direction relative to the subject vehicle as a steering reaction force. If a change occurs in the reaction force control mode as the obstacle conditions around the subject vehicle change, the controller 50 adjusts the timing for updating (starting or ending) the accelerator pedal reaction force control and the steering reaction force control. Namely, as the obstacle conditions around the subject vehicle change and operation and non-operation of the AF control device 80 and the SF control device 60 are switched accordingly, the controller 50 individually adjusts the operational timing (output timing) of the AF control device 80 and the operational timing (output timing) of the SF control device 60. Thus, since the accelerator pedal reaction force control and the steering reaction force control are updated individually with specific timing, the RPlongitudinal and the RPlateral can be communicated to the driver accurately, independently of each other. In addition, the operational timing of the AF control device 80 and the operational timing of the SF control device 60 are set appropriately in correspondence to changes occurring in the driving environment. As a result of the accelerator pedal reaction force control and the steering reaction force control thus executed, the driver is prompted to drive the subject vehicle in a desirable manner along the longitudinal direction and the lateral direction to stabilize the behavior of the subject vehicle, in other words, the driver is prompted to perform a longitudinal driving operation or a lateral driving operation to stabilize behavior of the vehicle. It is to be noted that the operational timing or output timing indicates the start timing or stop timing for operation of the AF control device 80 and the SF control device 60.

(2) If the AF control device 80 and the SF control device 60 having been in a stopped state both become activated as in case E shown in FIGS. 6A~6D, for instance, the operation of the AF control device 80 is started sooner by the predetermined time length $\Delta T$. Thus, the accelerator pedal 82 is pushed back through the accelerator pedal reaction force control to lower the vehicle speed, and the response of the driver's steering operation to the steering reaction force control is optimized to achieve stable vehicle behavior.

(3) If the operations of the AF control device 80 and the SF control device 60 having been engaged in operation both become stopped as in case H shown in FIGS. 11A~11C, for instance, the operation of the SF control device 60 is stopped sooner by the predetermined length of time $\Delta T$. As a result, the control on the accelerator pedal operation remains in effect until the steering operation becomes free and the behavior of the subject vehicle is stabilized.

(4) If there is a shift from conditions under which either the AF control device 80 or the SF control device 60 is engaged in operation to conditions under which the AF control device 80 and the SF control device 60 both start operating as in case F shown in FIGS. 7A~7C or case G shown in the FIGS. 9A~9C, the operation of the AF control device 80 is started or updated sooner by the predetermined length of time $\Delta T$. Thus, the accelerator pedal 82 is pushed back through the accelerator pedal reaction force control to lower the vehicle speed and the response of the driver's steering operation to the steering reaction force control is optimized to achieve stable vehicle behavior.

(5) If a shift occurs from conditions under which the AF control device 80 and the SF control device 60 are both engaged in operation to conditions under which the operation of either of the control devices stops, as in case I shown in FIGS. 12A~12C or case J shown in FIGS. 14A~14C, the operation of the SF control device 60 is stopped or updated sooner by the predetermined length of time $\Delta T$. As a result, the control on the accelerator pedal operation remains in effect until the steering operation becomes free and the behavior of the subject vehicle is stabilized.

(6) If a shift occurs from conditions under which either the AF control device 80 or the SF control device 60 is engaged in operation to conditions under which the other device that has not been operating becomes instead engaged in operation as in case K shown in FIGS. 15A and 15B or case L shown in FIGS. 16A and 16B, the operation of the other device is started sooner than the end of the operation of the device having been engaged in operation by the predetermined length of time $\Delta T$. As a result, the risk potential that has newly appeared can be promptly communicated to the driver.

(7) If the AF control device 80 and the SF control device 60 have been in a stopped state and then the operation of either of the control devices is started as in case A or B, the operation start timing is not delayed. As a result, any changes in the risk potential present along a single direction, i.e., either the longitudinal direction or the lateral direction can be communicated to the driver promptly.

(8) If either the AF control device 80 or the SF control device 60 has been engaged in operation and then the operation of the device stops, as in case C or D, the operation is stopped without a delay. As a result, any changes in the risk potential present along a single direction, i.e., either the longitudinal direction or the lateral direction can be communicated to the driver promptly.

Second Embodiment

Next, the driving assist system achieved in the second embodiment of the present invention is explained in reference to the drawings. The structure adopted in the driving assist system in the second embodiment is identical to that of the driving assist system achieved in the first embodiment shown in FIGS. 1 and 2. The following explanation focuses on the differences from the first embodiment.

FIG. 18 shows the execution timing of the longitudinal direction reaction force control and the lateral direction reaction force control in correspondence with the change in the obstacle conditions around the subject vehicle, i.e., the shift in the information communication mode. It is to be noted that FIG. 18 shows the timing for the reaction force control and the corresponding delay for case E and case H described earlier. In the second embodiment, the length of the delay is adjusted depending upon how the obstacle conditions change.

In case E shown in FIGS. 6A~6D (no information conveyance→longitudinal+lateral information conveyance), the timing with which the steering reaction force control is started is delayed by a predetermined length of time $\Delta T$ relative to the start of the accelerator pedal reaction force control. In case H shown in FIGS. 11A and 11B (longitudinal+lateral information conveyance→no information conveyance), on the other hand, the timing with which the accelerator pedal reaction force control ends is delayed by a predetermined length of time $w1 \times \Delta T$ relative to the end of the steering reaction force control. The predetermined lengths of the time lag $\Delta T$ and the time lag $w1 \times \Delta T$ are individually set so as to achieve $\Delta T > w1 \times \Delta T$ ($w1 < 1$).

Namely, in the second embodiment, the length of delay set when ending the reaction force control is shorter than the length of delay set when starting the reaction force control so as to free the accelerator pedal operation promptly.

It is to be noted that the length of delay is set to 0 in cases other than case E and case H, as shown in FIG. 18 to output commands for the accelerator pedal reaction force control and the steering reaction force control as soon as a change occurs in the obstacle conditions.

Figure 19:
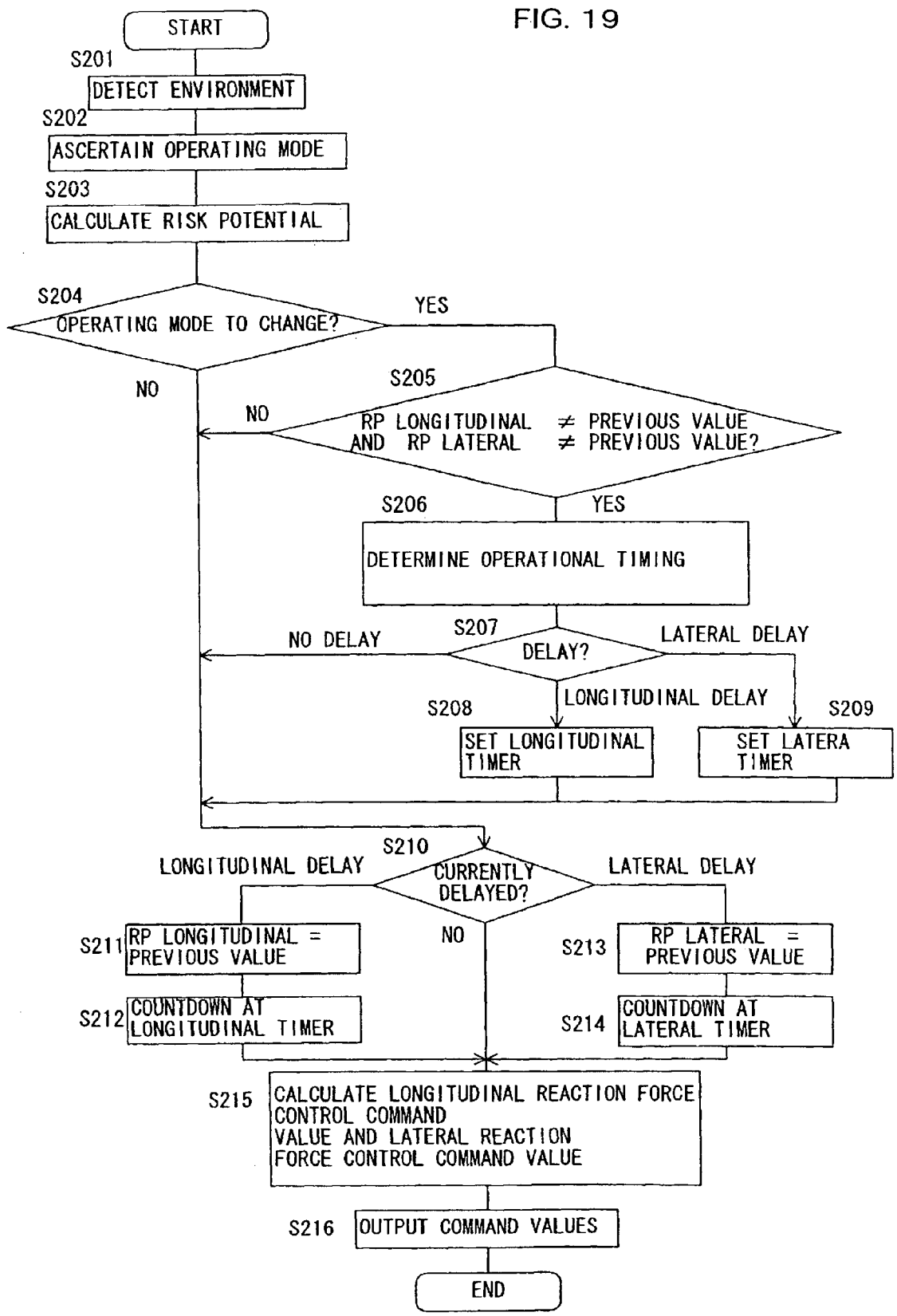
FIG. 19 presents a flowchart of the processing executed in conformance to the driving assist control program in the driving assist system in the second embodiment.

Next, in reference to the flowchart presented in FIG. 19, the procedure of the driving assist control processing executed in the second embodiment is explained. FIG. 19 presents a flowchart of the driving assist control processing executed by the controller 50. The processing is continuously executed at predetermined time intervals of, e.g., 50 msec.

Since the processing executed in steps S201~S205 is identical to the processing executed in steps S101~S105 in the flowchart presented and FIG. 17, a detailed explanation of the processing therein is omitted.

In step S206, a specific mode of the reaction force control to be executed is determined as shown in FIG. 18 in correspondence to the change having occurred in the obstacle conditions. More specifically, if the change having occurred in the obstacle conditions matches case E, the steering reaction force control is set to start with the delay $\Delta T$ relative to the start of the accelerator pedal reaction force control. If, on the other hand, the change having occurred in the obstacle conditions matches case H, the accelerator pedal reaction force control is set to end with the delay $w1 \times \Delta T$ relative to the end of the steering reaction force control. The timing with which the reaction force control commands are output is set so as to satisfy $\Delta T > w1 \times \Delta T$ during this process. If the change having occurred in the obstacle conditions does not match either case E or case H, the length of the delay is set to 0 to ensure that the reaction force control is executed without a delay.

In step S207, a decision is made as to whether or not any delay should be created in the reaction force control. If the change having occurred in the obstacle conditions matches case H, the operation proceeds to step S208. In step S208, the predetermined length of time $w1 \times \Delta T$ is set at the longitudinal timer so as to delay the accelerator pedal reaction force control. If, on the other hand, the change having occurred in the obstacle conditions matches case E, the operation proceeds to step S209. In step S209, the predetermined length of time $\Delta T$ is set at the lateral timer so as to delay the steering reaction force control. If the change having occurred in the obstacle conditions does not match either case E or case H, the operation proceeds to step S210.

Since the processing executed in subsequent steps S210~S216 is identical to the processing executed in steps S110~S116 in the flowchart presented in FIG. 17, a detailed explanation of the processing is omitted.

In the example explained above, the timing with which the accelerator pedal reaction force control is executed and the timing with which the steering reaction force control is executed are offset relative to each other only if the change having occurred in the obstacle conditions matches either case E or case H. And the length of the delay is adjusted depending upon whether the change in the obstacle conditions matches case E or case H. However, the length of delay may be adjusted in a similar manner when the change in the obstacle conditions matches a case other than case E or case H, as well.

FIG. 20 shows the timing with which the longitudinal direction reaction force control and the lateral direction reaction force control are executed for cases E~L. As shown in FIG. 20, the length of the delay created in the execution of the reaction force control is individually adjusted for each case. It is to be noted that a decision as to whether or not a delay is to be created with regard to the execution of the reaction force control for the individual cases is made as shown in FIG. 3. The specific lengths of delay to be created in correspondence to the individual cases are set by multiplying the reference delay $\Delta T$ set for case E by appropriate coefficients $w1 \sim w4$. These coefficients $w1 \sim w4$ may be set to appropriate values in advance in correspondence to the individual cases, or the coefficients $w1 \sim w4$ may be varied in conformance to the particulars of the risk potential present around the subject vehicle.

It is to be noted that the length of delay is set to 0 for cases other than cases E~L to output a command for the accelerator pedal reaction force control or the steering reaction force control as soon as a change occurs in the obstacle conditions, as shown in FIG. 20.

The second embodiment described above achieves the following advantage.

As shown in FIG. 18, the length of time $\Delta T$ by which the timing of starting the steering reaction force control is delayed in case E is set greater than the length of time $w1 \times \Delta T$ by which the timing of ending the accelerator pedal reaction force control is delayed in case H. As a result, the accelerator pedal reaction force control is terminated with a shorter delay to allow the accelerator pedal operation by the driver at his will to be resumed promptly.

It is to be noted that in the first and second embodiments described above, the RPlongitudinal corresponding to the preceding vehicle is calculated through (expression 1) and the RPdiagonal posed by a parked vehicle is calculated as the reciprocal of the TTC. In addition, the RPlateral posed by a lane marker or an adjacent vehicle present in the lateral direction relative to the subject vehicle is calculated by using the distance from the subject vehicle taken along the lateral direction. However, the risk potential corresponding to the individual obstacles may be calculated through methods other than these. For instance, the TTC may be calculated in correspondence to the individual obstacles present around the subject vehicle and then an integrated RPlongitudinal and an integrated RPlateral may be calculated as the sum of the longitudinal components and the sum of the lateral components of the TTC to each obstacles.

In addition, the risk potential to a guardrail installed at a bend, a lane marker extending along a bend or the like, which is present along a variable direction relative to the subject vehicle, may be calculated as described below. First, the guardrail or the lane marker detected to be present around the subject vehicle is divided into portions each corresponding to a very small angle relative to the subject vehicle. Then, the risk potential of the individual portions are calculated based upon the relative positions of the portions of the guardrail or the lane marker each corresponding to the very small angle. Finally, the risk potential of the guardrail or the lane marker is calculated by integrating the risk potential each corresponding to the small angle over the range in which the guardrail or the lane marker is present within the detection range.

In the first and second embodiments described above, the reaction force control is executed along the longitudinal direction relative to the subject vehicle by controlling the accelerator pedal reaction force. The longitudinal direction reaction force control may be instead achieved by controlling the reaction force generated at the braking pedal in addition to controlling the reaction force generated at the accelerator pedal 82. In such a case, the longitudinal direction reaction force control may be achieved by executing either the braking pedal reaction force control or the accelerator pedal reaction force control, or by combining the two types of reaction force control.

While various changes that may occur in the obstacle conditions are classified into cases A~L and the specific reaction force control start/end timing is set for each case in the first and second embodiments described above, changes that may occur in the obstacle conditions are not limited to these examples. In addition, the specific obstacle conditions that may match the individual cases are not limited to those illustrated in the figures. Furthermore, the reaction force control start/end timing in each case may be adjusted in correspondence to, for instance, the particulars of the risk potential as well.

The vehicle equipped with the driving assist system according to the present invention may adopt a structure other than that shown in FIG. 2.

While the laser radar 10 is utilized to detect the driving environment of the subject vehicle in the embodiments described above, a milliwave radar adopting another method, for instance, may be utilized instead.

The above described embodiments are examples, and various modifications can be made without departing from the spirit and scope of the invention.

The disclosure of the following priority application is herein incorporated by reference:

Japanese Patent Application No. 2002-282985 filed Sep. 27, 2002

What is claimed is:

1. A driving assist system for a vehicle, comprising:
 a driving environment detection device that detects a driving environment of the vehicle;
 a risk potential calculation device that calculates a risk potential present along a longitudinal direction (a RPlongitudinal) and a risk potential present along a lateral direction (a RPlateral) relative to the vehicle based upon the driving environment detected by the driving environment detection device;
 a longitudinal information conveyance device that presents the RPlongitudinal calculated by the risk potential calculation device to a driver;
 a lateral information conveyance device that presents the RPlateral calculated by the risk potential calculation device to the driver; and
 a timing control device that adjust an output timing of the longitudinal information conveyance device and an output timing of the lateral information conveyance device so as to prompt a driver to perform a longitudinal driving operation or a lateral driving operation to stabilize behavior of the vehicle when operation and non-operation of the longitudinal information conveyance device and the lateral information conveyance device are switched.

2. A driving assist system for a vehicle according to claim 1, wherein:
 if the operation of the longitudinal information conveyance device and the operation of the lateral information conveyance device have both been stopped and the longitudinal information conveyance device and the lateral information conveyance device are both to start operating, the timing control device allows the output timing of the longitudinal information conveyance device to precede the output timing of the lateral information conveyance device.

3. A driving assist system for a vehicle according to claim 1, wherein:
 if both the longitudinal information conveyance device and the lateral information conveyance device have been engaged in operation and the longitudinal information conveyance device and the lateral information conveyance device are both to stop operating, the timing control device allows the output timing of the lateral information conveyance device to precede the output timing of the longitudinal information conveyance device.

4. A driving assist system for a vehicle according to claim 1, wherein:
 if one of the longitudinal information conveyance device and the lateral information conveyance device has been engaged in operation and both the longitudinal information conveyance device and the lateral information conveyance device are to be engaged in operation, the timing control device allows the output timing of the longitudinal information conveyance device to precede the output timing of the lateral information conveyance device.

5. A driving assist system for a vehicle according to claim 1, wherein:
 if both the longitudinal information conveyance device and the lateral information conveyance device have been engaged in operation and one of the longitudinal information conveyance device and the lateral information conveyance device is to stop operating, the timing control device allows the output timing of the lateral information conveyance device to precede the output timing of the longitudinal information conveyance device.

6. A driving assist system for a vehicle according to claim 1, wherein:
 if an operational change occurs from a state in which one of the longitudinal information conveyance device and the lateral information conveyance device is engaged in operation to a state in which another conveyance device not having been engaged in operation becomes engaged in operation instead, the timing control device allows the output timing of the other conveyance device to precede the output timing of the conveyance device having been engaged in operation.

7. A driving assist system for a vehicle according to claim 1, wherein:
if neither the longitudinal information conveyance device nor the lateral information conveyance device has been engaged in operation, the timing control device allows one of the longitudinal information conveyance device and the lateral information conveyance device to start operating as soon as a change occurs in the driving environment around the vehicle.

8. A driving assist system for a vehicle according to claim 1, wherein:
if one of the longitudinal information conveyance device and the lateral information conveyance device has been engaged in operation, the timing control device stops the operation of the conveyance device having been engaged in operation as soon as a change occurs in the driving environment around the vehicle.

9. A driving assist system for a vehicle according to claim 1, wherein:
the timing control device; (a) sets a length of time for a delay to be created in the output timing of the longitudinal information conveyance device and the output timing of the lateral information conveyance device in correspondence to a change in the driving environment around the vehicle and (b) allows the operation of the longitudinal information conveyance device and the operation of the lateral information conveyance device to start/stop in conformance to the length of the delay having been set.

10. A driving assist system for vehicle according to claim 1, wherein:
the longitudinal information conveyance device comprises an accelerator pedal reaction force control device that controls an operational reaction force generated at an accelerator pedal in correspondence to the RPlongitudinal.

11. A driving assist system for a vehicle according to claim 1, wherein:
the lateral information conveyance device comprises a steering reaction force control device that controls a steering reaction force generated at a steering wheel in correspondence to the RPlateral.

12. A driving assist system for a vehicle, comprising:
a driving environment detection means for detecting a driving environment of the vehicle;
a risk potential calculation means for calculating a risk potential present along a longitudinal direction (a RPlongitudinal) and a risk potential present along a lateral direction (a RPlateral) relative to the vehicle based upon the driving environment detected by the driving environment detection means;
a longitudinal information conveyance means for presenting the RPlongitudinal calculated by the risk potential calculation means to a driver;
a lateral information conveyance means for presenting the RPlateral calculated by the risk potential calculation means to the driver; and
a timing control means that adjust an output timing of the longitudinal information conveyance means and an output timing of the lateral information conveyance means so as to prompt a driver to perform a longitudinal driving operation or a lateral driving operation to stabilize behavior of the vehicle when operation and non-operation of the longitudinal information conveyance means and the lateral information conveyance means are switched.

13. A vehicle driving assist method, comprising:
detecting a driving environment of a vehicle;
calculating a risk potential present along a longitudinal direction (a RPlongitudinal) and a risk potential present along a lateral direction (a RPlateral) relative to the vehicle based upon the driving environment;
conveying the calculated RPlongitudinal to a driver;
conveying the calculated RPlateral to the driver; and
adjusting output timing for conveying the RPlongitudinal and output timing for conveying the RPlateral so as to prompt a driver to perform a longitudinal driving operation or a lateral driving operation to stabilize behavior of the vehicle when information conveyance mode is changed.

14. A vehicle, comprising:
a driving environment detection device that detects a driving environment of the vehicle;
a risk potential calculation device that calculates a risk potential present along a longitudinal direction (a RPlongitudinal) and a risk potential present along a lateral direction (a RPlateral) relative to the vehicle based upon the driving environment detected by the driving environment detection device;
a longitudinal information conveyance device that presents the RPlongitudinal calculated by the risk potential calculation device to a driver;
a lateral information conveyance device that presents the RPlateral calculated by the risk potential calculation device to the driver; and
a timing control device that adjust an output timing of the longitudinal information conveyance device and an output timing of the lateral information conveyance device so as to prompt a driver to perform a longitudinal driving operation or a lateral driving operation to stabilize behavior of the vehicle when operation and non-operation of the longitudinal information conveyance device and the lateral information conveyance device are switched.

* * * * *